(12) United States Patent
Leininger

(10) Patent No.: US 9,803,151 B2
(45) Date of Patent: Oct. 31, 2017

(54) SYSTEM AND METHOD FOR GASIFICATION

(71) Applicant: General Electric Company, Schenectady, NY (US)

(72) Inventor: Thomas Frederick Leininger, Chino Hills, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/080,043

(22) Filed: Mar. 24, 2016

(65) Prior Publication Data
US 2017/0275544 A1 Sep. 28, 2017

(51) Int. Cl.
| C10J 3/54 | (2006.01) |
| C10J 3/72 | (2006.01) |
| C10J 3/48 | (2006.01) |
| C10J 3/46 | (2006.01) |
| C10J 3/84 | (2006.01) |
| C10K 1/02 | (2006.01) |
| C01B 3/02 | (2006.01) |

(52) U.S. Cl.
CPC ............... *C10J 3/721* (2013.01); *C01B 3/02* (2013.01); *C10J 3/466* (2013.01); *C10J 3/485* (2013.01); *C10J 3/84* (2013.01); *C10K 1/026* (2013.01)

(58) Field of Classification Search
CPC combination set(s) only.
See application file for complete search history.

(56) References Cited

U.S. PATENT DOCUMENTS

| 2,574,503 A | 11/1951 | Simpson |
| 2,838,388 A * | 6/1958 | Carkeek .............. B01J 8/20 |
| | | 252/373 |
| 2,971,823 A | 2/1961 | Jahing et al. |
| 3,236,745 A | 2/1966 | Metrailer |

(Continued)

FOREIGN PATENT DOCUMENTS

WO 2004024846 A1 3/2004

*Primary Examiner* — Kaity Chandler
(74) *Attorney, Agent, or Firm* — Fletcher Yoder, P.C.

(57) ABSTRACT

A system includes a first reactor that may gasify a first feed to generate a first syngas. The first feed has a first particle size distribution ($PSD_1$). The system also includes a second reactor that may receive the first feed, a second feed, and at least a portion of the first syngas. The second reactor may gasify the second feed to generate additional syngas, and the second feed has a second particle size distribution ($PSD_2$) that is different from the first PSD. The second reactor includes an elutriation zone disposed on a first end of the second reactor. The elutriation zone may receive the first and second feed. The second reactor also includes a fluidized bed disposed at a second end of the second reactor that is substantially opposite the first end. The fluidized bed is fluidly coupled to the first reactor and may receive the portion of the first syngas via a syngas inlet. The system also includes a gas-solids separation section fluidly coupled to the first and second reactors. The gas-solids separation section may receive the first feed and partially reacted particles of the second feed from the elutriation zone and may feed a combined feed consisting of the first feed and the partially reacted particles of the second feed to the first reactor.

10 Claims, 9 Drawing Sheets

(56) References Cited

U.S. PATENT DOCUMENTS

| | | | | |
|---|---|---|---|---|
| 3,715,195 | A | * | 2/1973 | Tassoney ................ C10J 3/00 |
| | | | | 252/373 |
| 3,971,635 | A | * | 7/1976 | Matthews ................ C10J 3/54 |
| | | | | 252/373 |
| 4,347,064 | A | * | 8/1982 | Reh .......................... C10J 3/54 |
| | | | | 201/31 |
| 4,386,940 | A | * | 6/1983 | Sacks ....................... C10J 3/54 |
| | | | | 252/373 |
| 4,391,612 | A | | 7/1983 | Chang |
| 4,875,919 | A | | 10/1989 | DeSaro et al. |
| 5,125,943 | A | | 6/1992 | Cole |
| 5,690,896 | A | | 11/1997 | Stangeland et al. |
| 5,762,681 | A | * | 6/1998 | Lee, II ................ C21B 13/002 |
| | | | | 266/172 |
| 5,919,038 | A | | 7/1999 | LaBelle et al. |
| 5,992,041 | A | | 11/1999 | McClaine et al. |
| 7,618,558 | B2 | | 11/2009 | Nielsen |
| 8,982,011 | B1 | | 3/2015 | Gregoire et al. |
| 2014/0219908 | A1 | | 8/2014 | Tomasik |
| 2014/0259924 | A1 | | 9/2014 | Leininger |
| 2015/0165394 | A1 | | 6/2015 | Leininger |

\* cited by examiner

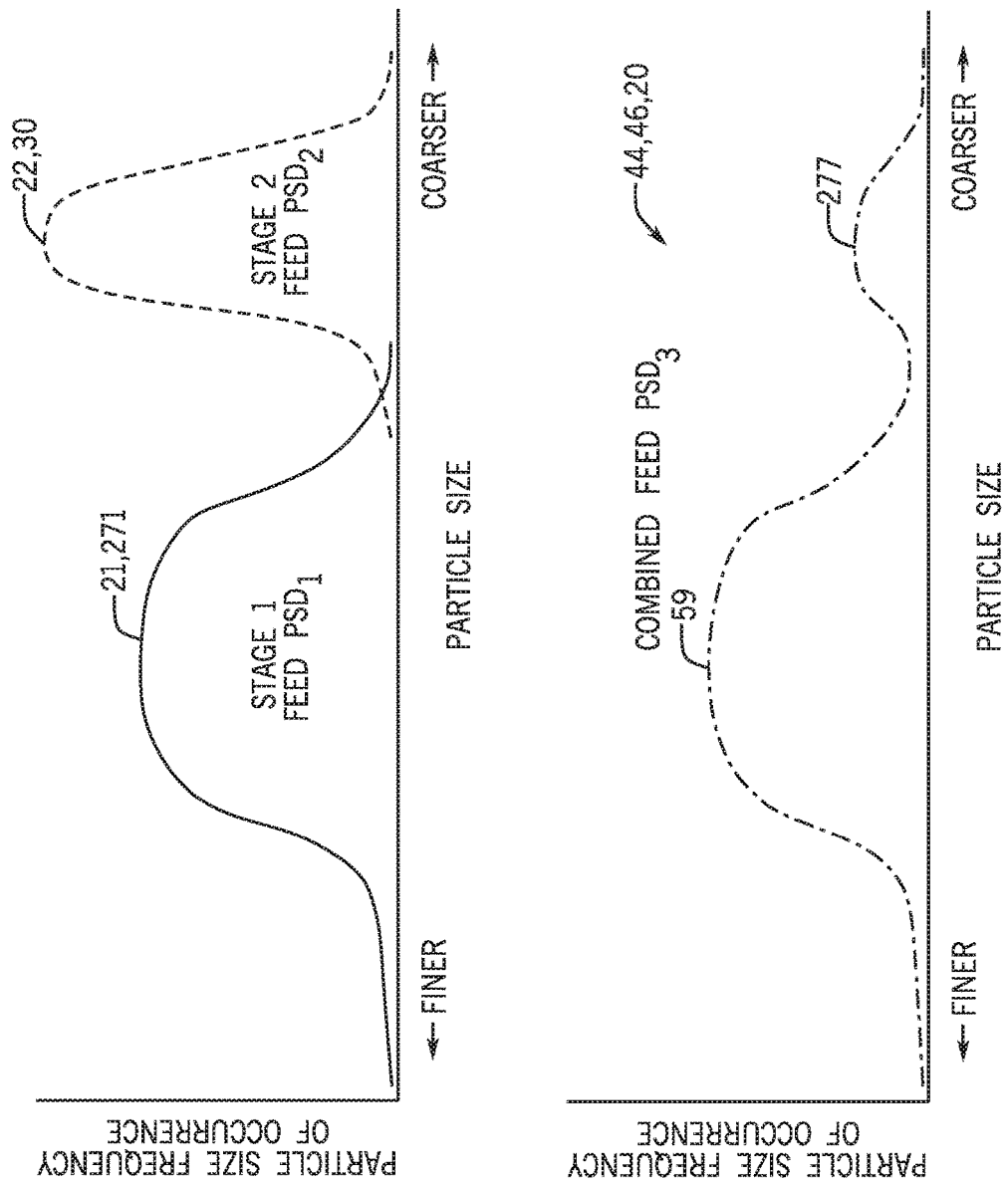

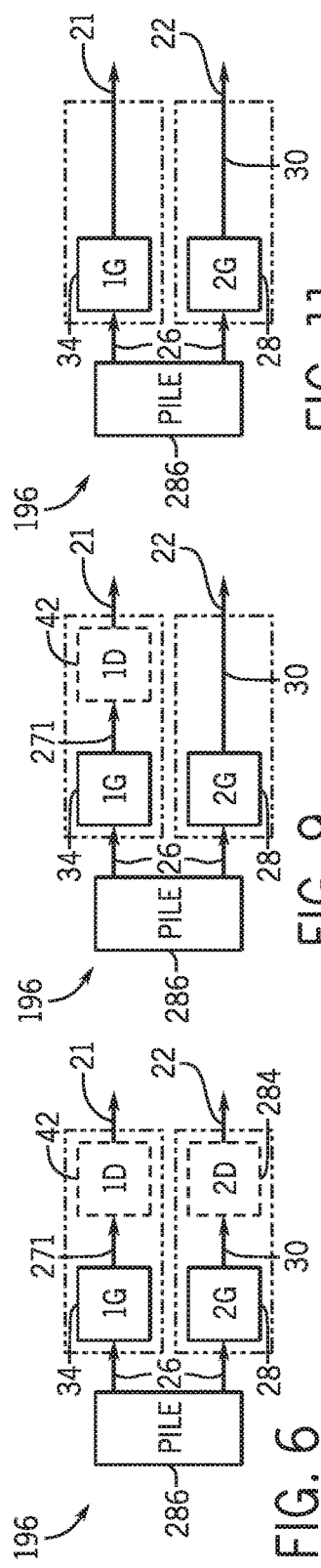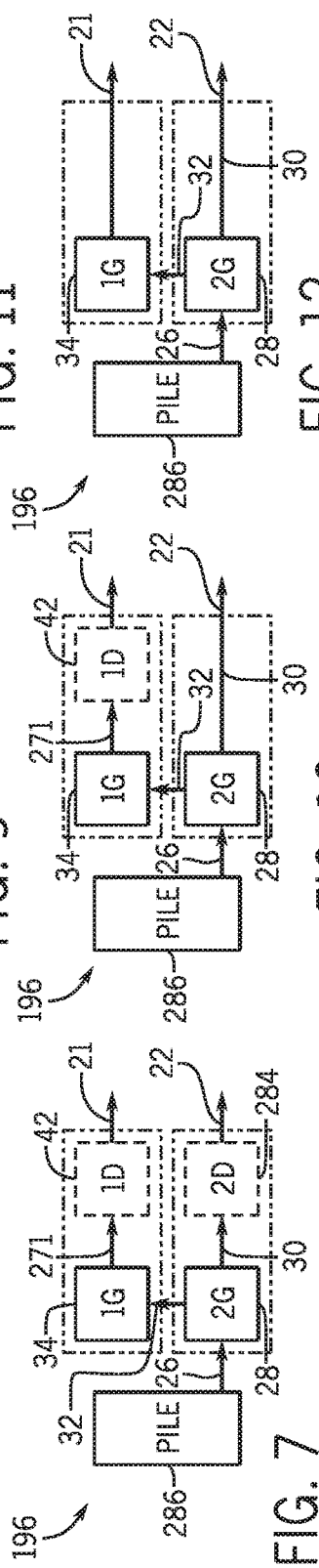

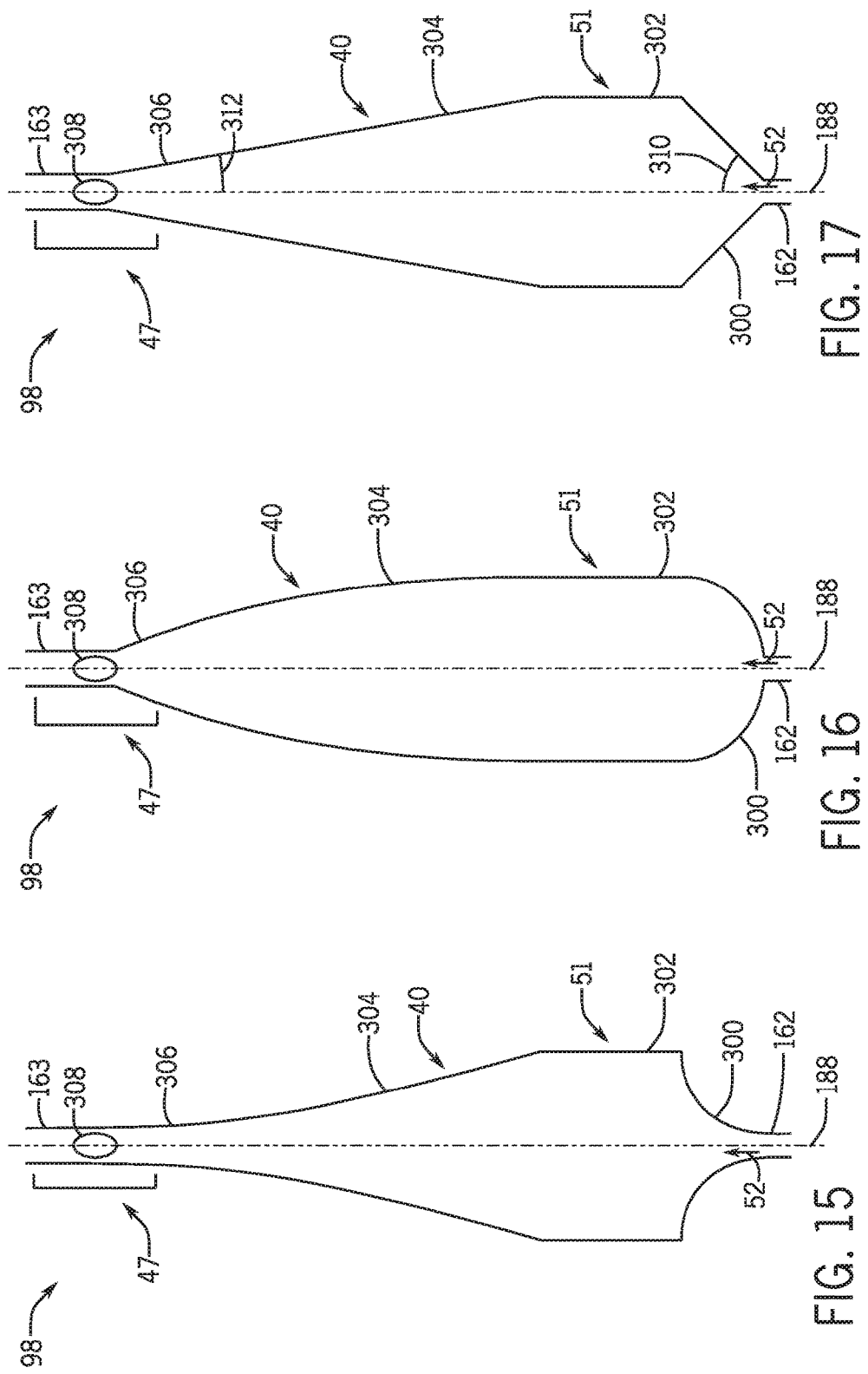

SYSTEM AND METHOD FOR GASIFICATION

BACKGROUND

The subject matter disclosed herein relates to gasification systems and, more particularly, to a reactor system that may be used with a gasifier to improve the efficiency of the gasification system and to adjust the composition of the final product gas.

Gasifiers convert carbonaceous materials into a gaseous mixture consisting primarily of carbon monoxide and hydrogen, referred to as synthesis gas or syngas. For example, a gasification system may include one or more gasifiers that react a feedstock at a high temperature with oxygen and water or steam to produce syngas. The syngas may be used for power generation, chemical production, or any other suitable application. Prior to use, the syngas may be cooled in a syngas cooler and treated in a gas treatment system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first reactor that may gasify a first feed to generate a first syngas. The first feed has a first particle size distribution ($PSD_1$). The system also includes a second reactor that may receive the first feed, a second feed, and at least a portion of the first syngas. The second reactor may gasify the second feed to generate additional syngas, and the second feed has a second particle size distribution ($PSD_2$) that is different from the first PSD. The second reactor includes an elutriation zone disposed on a first end of the second reactor. The elutriation zone may receive the first and second feed. The second reactor also includes a fluidized bed disposed at a second end of the second reactor that is substantially opposite the first end. The fluidized bed is fluidly coupled to the first reactor and may receive the portion of the first syngas via a syngas inlet. The system also includes a gas-solids separation section fluidly coupled to the first and second reactors. The gas-solids separation section may receive the first feed and partially reacted particles of the second feed from the elutriation zone and may feed a combined feed consisting of the first feed and the partially reacted particles of the second feed to the first reactor.

In a second embodiment, a method includes supplying a first feed having a first particle size distribution ($PSD_1$) to a first reactor that may gasify the first feed to generate a first syngas and supplying a mixture of the first feed and a second feed to a first end of a second reactor. The second feed has a second particle size distribution ($PSD_2$) different from the first $PSD_1$. The method also includes directing a first portion of the first syngas to a second end of the second reactor. The second end is substantially opposite the first end such that a flow of the first portion of the first syngas is counter current to a flow of the second feed in the second reactor. The method also includes separating the first feed from the mixture in the second reactor and gasifying the second feed in the second reactor to generate additional syngas. The second reactor utilizes heat from the first portion of the first syngas to gasify the second feed. The method further includes recovering the first feed in a gas-solids separation section fluidly coupled to the first and second reactors and directing the first feed from the gas-solids separation section to the first reactor to generate the first syngas.

In a third embodiment, a system includes a first feed system including a first grinder, a second grinder, and a feed combining and packing system. The feed combining and packing system may receive a first feed having a first particle size distribution ($PSD_1$) from the first grinder via a first feed path extending between the first grinder and the feed combining and packing system and may receive a second feed having a second particle size distribution ($PSD_2$) from the second grinder via a second feed path separate from the first feed path and extending between the second grinder and the feed combining and packing system. The system also includes a first reactor that may receive and gasify the first feed to generate a first syngas and a second reactor that may receive the first feed, the second feed, and at least a portion of the first syngas and may gasify the second feed to generate additional syngas. The second reactor includes an elutriation zone disposed on a first end of the second reactor. The elutriation zone may receive the first and second feed from the feed system via a combined feed path extending between the first feed system and the second reactor. The second reactor also includes a fluidized bed disposed at a second end of the second reactor that is substantially opposite the first end. The system also includes a fluid path extending between an outlet of the first reactor and an inlet of the second reactor that is disposed on the second end. The fluid path may supply the first syngas to the fluidized bed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a graph illustrating an embodiment of a particle size distribution (PSD) for a first stage feed and a separate, second stage feed that may be used by the gasification system of FIG. 1 to generate syngas;

FIG. 5 is a graph illustrating an embodiment of a particle size distribution (PSD) for a mixture of the first stage feed and the second stage feed of FIG. 4;

FIG. 6 is a schematic diagram of an embodiment of a raining bed reactor feed system that may be used with the gasification system of FIGS. 1, 2, 14, 18 and 19 in which the raining bed reactor feed system includes first and second stage feedstock grinders and dryers, and each feedstock grinder receives feedstock from a feedstock pile;

FIG. 7 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders and dryers, and the first stage feedstock grinder receives feedstock from the second stage feedstock grinder;

FIG. 8 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders and dryers, and the first stage feedstock grinder receives feedstock from the second stage feedstock dryer;

FIG. 9 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders and a first feedstock dryer, and each feedstock grinder receives feedstock from a feedstock pile;

FIG. 10 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders and a first feedstock dryer, and the first stage feedstock grinder receives feedstock from the second stage feedstock grinder;

FIG. 11 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders, and each feedstock grinder receives feedstock from a feedstock pile;

FIG. 12 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders, and the first stage feedstock grinder receives feedstock from the second stage feedstock grinder;

FIG. 13 is a schematic diagram of an embodiment of the grinding and drying section of a raining bed reactor feed system configuration that may be used with the gasification system of FIGS. 1, 2, 14, 18 and 19 in which the raining bed reactor feed system includes first and second stage feedstock grinders and a second stage feedstock dryer, and the first stage feedstock grinder receives feedstock from the second stage feedstock dryer;

FIG. 15 is a schematic diagram of an embodiment of a portion of the raining bed reactor system of FIG. 14 in which a fluidized bed has a convex floor and in which a tapered column has a convex wall;

FIG. 16 is a schematic diagram of an embodiment of a portion of the raining bed reactor system of FIG. 14 in which a fluidized bed has a concave floor and in which a tapered column has a concave wall;

FIG. 17 is a schematic diagram of an embodiment of a portion of the raining bed reactor system of FIG. 14 in which a fluidized bed has a straight floor and in which a tapered column has a straight wall;

DETAILED DESCRIPTION

Figure 1:
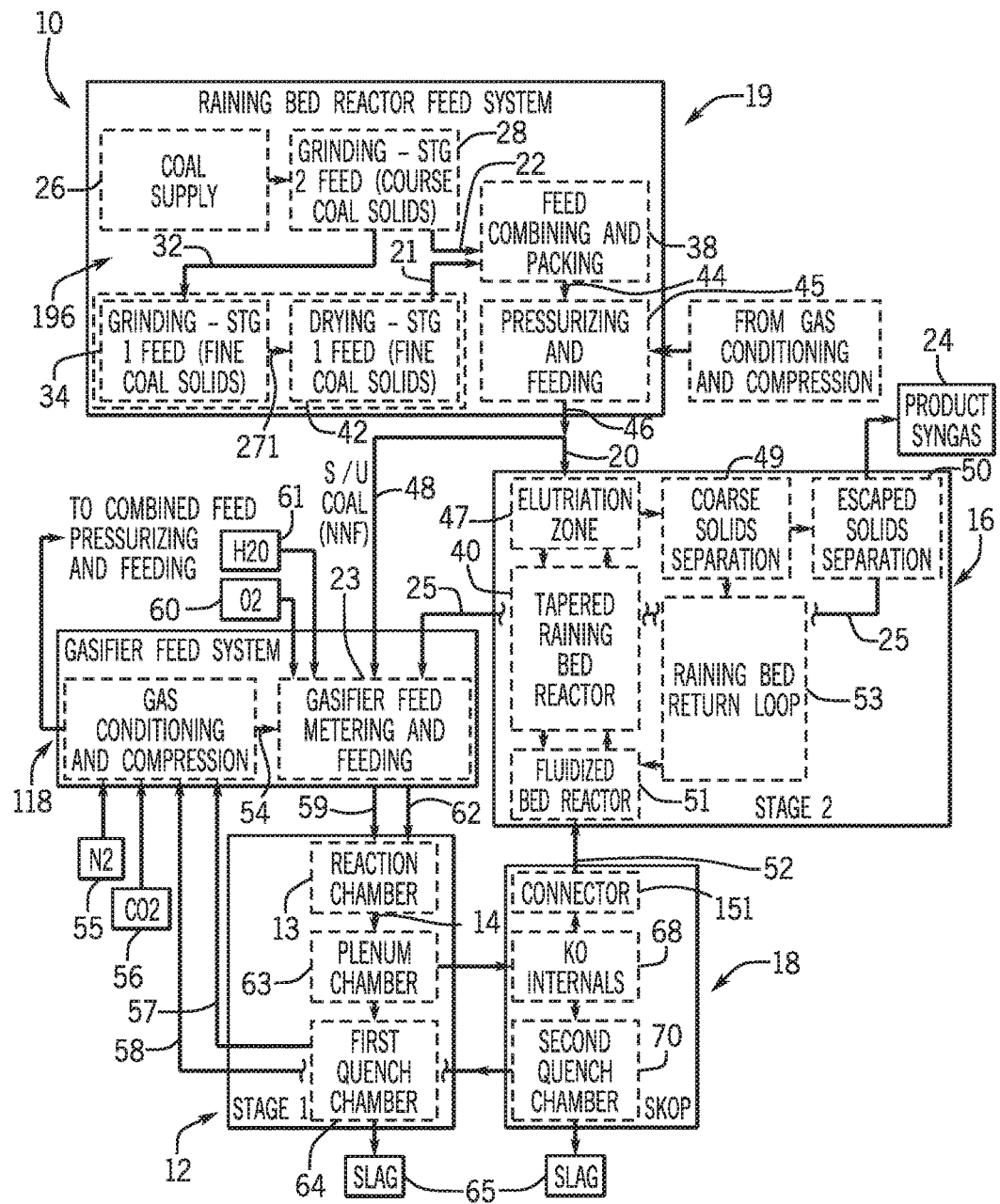
FIG. 1 is a block diagram of an embodiment of a gasification system including a gasifier configured to generate a first syngas and a raining bed reactor system configured to generate a product syngas.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are generally directed toward a gasification system configured to increase gasification efficiency by reducing the water content of feedstock, increasing the effectiveness of heat and mass transfer between reactants and products, and recovering thermal energy from product syngas. Generally, during gasification, a feedstock (e.g., fuel) undergoes partial oxidation in the gasifier to produce synthesis gas, also referred to as syngas. Current gasification systems are configured to employ gasification techniques that either decrease an amount of feed water in the feedstock fed to the gasifier, increase the effectiveness of heat and mass transfer by employing a counter-current reactor configuration, or recover thermal energy from the resultant syngas by gasifying additional feedstock. However, it has been recognized that there are currently no gasification systems that effectively utilize a combination of the aforementioned techniques.

Known coal gasification processes attempt to maximize the efficiency of syngas production by various means. Examples include reducing the amount of excess water fed to the gasifier, controlling the way reactants mix in such a way as to maximize heat and mass transfer within the gasifier and effectively recovering thermal energy from the high temperature product syngas. By judicious application of these and other means of enhancing efficiency, the amount of oxygen and/or coal consumed per unit of syngas produced may be reduced and the fraction of energy in the coal feed retained in the product syngas may be increased. Achieving these goals reduces the operating cost and improves the economic viability of a gasification process.

For example, known gasifiers, such as fixed bed (a.k.a. moving bed) gasifiers, employ a countercurrent configuration in which relatively large pieces (≥6 mm) of dry coal are passed downwards through a reactor vessel against an upwards flow of hot gases generated at the bottom of the reactor by combustion of partially reacted coal with either air or pure oxygen. This countercurrent configuration, which minimizes the heat and mass transfer gradients between the gas and the coal, is very effective in recovering thermal energy from the gas, in converting that thermal energy into the chemical energy of the product syngas and in reducing the amount of coal and oxygen that is consumed to produce that syngas. And the fact that relatively large pieces of dry coal can be fed to the gasifier means that both the grinding energy and the amount of excess water in the gasification process can be minimized. However, such fixed bed processes are known to have some limitations that may affect economic viability. One limitation is gasifier throughput; the rate at which the large pieces of coal can be converted into syngas within the gasifier is low because of mass transfer limitations. As a result, many trains of fixed bed gasifiers are generally used for certain syngas production plants with high target throughputs. Another limitation of certain fixed bed process may be handling coal fines as part of the gasifier feed. Fine coal particles (≤1 mm) are carried out of the top of the fixed bed by the rising gases as soon as the fine coal particles are added to the fixed bed gasifier rather than slowly descending through the bed along with the larger coal pieces. Since conventional coal production, transportation, grinding and feeding processes all tend to generate fines as part of the processes, entrainment of the fine coal particles in the rising gases may present certain challenges in fixed bed gasifying processes. For example, 50% of the coal feed to a fixed bed gasifier may be too fine for the fixed bed, resulting in a large off-spec coal stream that must be disposed of, fed to another coal-consuming process (e.g., a competing coal gasifier), or processed through some sort of a briquetting or pelletizing process that converts fine coal into larger pieces that are suitable for feeding to a fixed bed gasifier. In all of these cases, the economic viability of the fixed bed gasification process may be decreased compared to systems that are configured to handle fine coal particles in the feed.

In another example, known gasifiers, such as two-stage entrained flow gasifiers, employ a second gasifier stage downstream of the primary gasification reactor in order to improve efficiency. In one known system, an entrained flow gasifier is used as a first stage to produce hot syngas that flows into a second stage entrained flow gasifier positioned vertically above it. As the hot syngas produced in the first stage rises through the second stage, additional coal feed in the form of a water-based slurry is injected into the second stage. Inside the second stage, the rising hot syngas is cooled as it transfers a portion of its thermal energy to the coal-water slurry, thereby driving the production of additional syngas. In this co-current configuration, the syngas from the first stage and the coal-water slurry injected into the second stage flow in the same direction resulting in heat and mass transfer gradients that are initially very large but then diminish as the reacting mixture progresses through the second stage. As a result of the transfer of thermal energy from the hot first stage syngas to the coal-water slurry and the consumption of that energy by the gasification reactions within the second stage, the reaction product exiting the second stage is significantly cooler compared with the high temperature of the hot syngas exiting the first stage. In at least one known two-stage entrained flow gasification process, incompletely reacted coal recovered from the second stage gasifier is recycled to the first stage gasifier (with or without additional first stage feed) in order to generate the hot syngas needed for the second stage. The two-stage gasification process described above improves gasification efficiency by efficiently recovering some of the thermal energy of the syngas from the first stage as chemical energy of the additional syngas produced in the second stage. In this way, the oxygen required to produce a unit of syngas is reduced compared with the oxygen requirement of a single stage entrained flow gasifier. Compared with the fixed bed gasifier, the two-stage entrained flow gasifier described above has a much higher throughput. This is due to the faster reaction rates achievable with the fine coal particles comprising the coal-water slurry feed as well as the much higher gasifier operating temperatures. The higher throughput of the two-stage entrained flow gasifier gives it a significant economic advantage compared with the fixed bed gasifier, especially for high target throughput plants, because far fewer gasifier trains are required. However, the co-current reactor configuration of the second stage is less efficient than the countercurrent configuration of the fixed bed gasifier with respect to syngas production. And the fact that coal is fed to the second stage with excess water in the form of a coal-water slurry results in an additional efficiency disadvantage compared with the fixed bed gasifier.

Given the limitations of the above examples, it may be desirable to have a gasification system that effectively combines all three techniques—reducing the water content in the feed, employing a counter-current reactor design and using product syngas thermal energy to drive production of additional syngas—in order to configure a gasifier system that maximizes gasifier efficiency and gasifier throughput while, at the same time, reduces the consumption of oxygen and coal per unit of syngas produced.

As discussed in detail below, the disclosed embodiments include a multi-stage (e.g., two-stage) gasification system including a first stage gasifier (e.g., a reactor) configured to gasify fine feedstock particles (e.g., having a particle size distribution with most particles substantially smaller than approximately 2 millimeters (mm)) and a second stage raining bed reactor system configured to gasify coarse feedstock particles (e.g., having a particle size distribution of between approximately 250 microns (μm) and approximately 25 mm, between approximately 500 μm and approximately 20 mm, between approximately 1 mm and approximately 15 mm or between approximately 2 mm and approximately 10 mm) and to recover fine feedstock particles. The recovered fine feedstock particles may be provided as feedstock for the gasifier. The raining bed reactor system may also recover heat from syngas generated in the gasifier to dry, preheat and gasify the coarse feedstock particles and generate additional syngas, thereby increasing the output and efficiency of the gasification system.

FIG. 1 shows an embodiment of a two-stage gasification system 10 including a gasifier 12 (first stage) configured with a reaction chamber 13 that generates a first syngas 14, a counter current raining bed reactor system 16 (second stage) configured to generate a product syngas 24, a particulate removal system 18 configured to remove entrained particulates from the first syngas 14 between the gasifier 12 and the raining bed reactor 16, a raining bed reactor feed system 19 configured to supply a combined feed 20 consisting of a first stage feed 21 and a second stage feed 22 to the raining bed reactor system 16 and a gasifier feed system 23 configured to receive a combined flow 25 of the first stage feed 21 and partially reacted particles of the second stage feed 22 from the raining bed reactor system 16 and to feed that combined flow 25 to the gasifier 12. Product syngas 24 generated by the two-stage gasification system 10 includes major components such as $CO$, $H_2$, $CO_2$ and $H_2O$ and minor components such as $CH_4$, $N_2$, $Ar$, $H_2S$ and $COS$, as well as several other components at the trace component level.) The product syngas 24 may be scrubbed to remove contaminants and then used as a fuel to generate electrical power or as a feedstock to synthesize chemicals, hydrogen or liquid fuels.

In the illustrated embodiment, the feedstock 26 (e.g., coal, petroleum coke or other solid fuel) is directed to a second stage grinding unit 28 that grinds the feedstock 26 to generate a second stage feed portion 30 and a first stage feed portion 32. The second stage grinding unit 28 is configured to grind the feedstock 26, such that the second stage feed portion 30 has a coarse particle size distribution ($PDS_2$), as illustrated on the right-hand side of FIG. 4. In the illustrated embodiment, the first stage feed portion 32 is supplied to a first stage grinding unit 34 for additional grinding, and the second stage feed portion 30 is supplied to a feed combining and packing system 38 as the second stage feed 22. The second stage feed portion 30 may not be dried before feeding to the feed combining and packing device 38 as the second stage feed 22. This is due, in part, because the second stage feed 22 may be dried in a tapered raining bed reactor column 40 as it flows through the reactor column 40 against a flow of hot syngas generated in the gasifier 12. However, in certain embodiments, the second stage feed 30 may be dried in a feed dryer (not shown in FIG. 1) before being fed to the feed combining and packing system 38 as the second stage feed 22. The first stage feed portion 32 is ground in the first stage grinding unit 34 to generate the first stage feed 271 having a fine particle size distribution ($PSD_1$), as illustrated on the left-hand side of FIG. 4. In the illustrated embodiment, the first stage feed portion 32 is dried in a first stage feed drying unit 42 to create a dried first stage feed 21 before being fed to the feed combining and packing system 38, where the dried first stage feed 21 is combined with the second stage feed 22 to form a combined first stage and second stage feed 44. The combined first stage and second stage feed 44 may be pressurized and metered in the pressurizing and feeding section 45 to generate a metered stream of pressurized combined feed 46.

During normal, steady state operation of gasification system 10, the metered stream of pressurized combined feed 46 may be directed to an elutriation zone 47 of the raining bed reactor system 16 to serve as the combined first and second stage feed 20 to the raining bed reactor system 16, as discussed below. However, during startup, a reduced flow rate of the pressurized combined feed 46 may be directed to the gasifier feed and metering system 23 to serve as a startup feed 48. The gasifier feed and metering system 23 supplies the startup feed 48 to the gasifier 12 in order to generate the first syngas 14 needed to start up the raining bed reactor system 16. After startup of the raining bed reactor system, the pressurized combined feed 46 may be diverted from the gasifier feed metering and feeding section 23 to the elutriation zone 47; and the flow rate of the pressurized combined feed may be increased to the normal operating rate in order to help establish normal, steady state operation of gasification system 10. Because the gasifier 12 generally requires coal feed with a finer PSD than the raining bed reactor system 16, the second stage grinding unit 28, the first stage grinding unit 34, the first stage drying unit 42 and the feed combining and packing system 38 may be operated in such a way as to produce a metered stream of pressurized coal 46 that has the finer PSD required by the gasifier. For example, a reduced flow rate of coal 26 may be sent to the second stage grinding unit 28, and the entire product of the second stage grinding unit 28 may be directed to the first stage grinding unit 34 as first stage feed portion 32, while no coal may be sent as second feed 22 to the feed combining and packing system 38. After drying in the first stage drying unit 42, the first stage feed portion 32 may be sent to the feed combining and packing system 38 which operates with only the single feed portion to provide a "combined" feed 44 to the pressurizing and feeding system 45. The pressurizing and feeding system 45 then pressurizes and meters the "combined" feed 44 to generate the metered and pressurized "combined" feed stream 46 which is then diverted to the gasifier feed metering and feeding system 23 for startup. It will be appreciated by those skilled in the art that, while the startup operation described above serves as one way to provide the gasifier with appropriate feed during startup, there will be other ways that the equipment within the raining bed reactor feed system 16 can be designed and operated in order to provide the startup coal feed 48 with the appropriate properties.

During normal, steady state operation, with the normal flow rate of metered and pressurized combined feed 20 being fed to the elutriation zone 47, aerodynamic forces within the elutriation zone separate the pressurized combined feed 20 into its original components of the finer, first stage feed 21 and the coarser, second stage feed 22. The finer, first stage feed 21 particles are dragged out through the top of the elutriation zone 47 by the upwards flow of syngas. The finer, first stage feed 21 particles and the syngas together pass through a coarse solids separation section 49 and enter an escaped solids separation section 50 where all of the solids are separated from the syngas in order to produce a particle free product syngas 24. Due to its larger average particle size, the second stage feed 22 descends into the tapered raining bed reactor column 40 and then into a fluidized bed reactor 51. As the second stage feed 22 descends, it dries, preheats, pyrolyzes and then gasifies by absorbing heat from the portion 52 of the first syngas 14 that exits the particulate removal section 18 to generate the final product syngas 24. As gasification of the second stage feed 22 proceeds within the fluidized bed reactor 51, the average particle size of the second stage feed 22 gradually decreases to the point where the upward flowing syngas within the reactor drags the partially reacted particles upwards into the tapered raining bed reactor column 40. Once the partially reacted particles of the second stage feed 22 are dragged up into the tapered raining bed reactor, two things happen that favor their continued upward movement. First, the diameters and the masses of the particles continue to decrease, which makes it easier for the upwards flowing syngas to continue to drag them upwards. Second, because the tapered raining bed reactor column 40 narrows in the upwards direction, the gas velocity increases in the upwards direction and, therefore, the drag force on the ever diminishing particles increases in the upwards direction. As a result of these upwardly increasing drag forces, the partially reacted particles of the second stage feed 22 are carried up through the elutriation zone 47 and then into the coarse solids separation section 49, as discussed with respect to FIG. 14, below. Initially, the partially reacted particles are too large to pass through to the overhead of the coarse solids separation section 49, so they exit the bottom of the coarse solids separation section and are returned to the fluidized bed reactor 51 via a raining bed return loop 53.

Eventually the particles comprising the second stage feed 22 gasify sufficiently so that their sizes diminish to the point where the rising syngas not only drags them back up into the elutriation zone 47, but also through the coarse solids separation section 49 and the escaped solids separation section 50. Once in the upper portion of the elutriation zone 47, the partially reacted particles of the second stage feed 22 combine with the particles of the first stage feed 21 and, together, they are carried through the overhead of the coarse solids separation section 49 and into the escaped solids separation section 50 where all of the particles (both the partially reacted particles of the second stage feed 22 and the particles of the first stage feed 21) are removed from the syngas to generate a particle free product syngas 24. The escaped solids separation section 50 separates all of the solids from the product syngas 24 and supplies the gasifier feed and metering system 23 with a combined first stage feed 25 consisting of the first stage feed 21 plus the fine, partially reacted particles of the second stage feed 22. The gasifier feed and metering system 23 meters the combined first stage feed 25 into the gasifier 12 to generate the first syngas 14 which, following particulate removal, provides the syngas portion 52 that enters the bottom of the fluidized bed reactor 51 of the raining bed reactor system 16. The combined first stage feed 25 may be combined with a carrier gas 54 (which may be $N_2$ 55 or $CO_2$ 56 or a first quenched syngas 57 or a second quenched syngas 58 or a combination thereof) to facilitate a flow of the combined first stage feed 25 into the gasifier 12. The gasifier feed metering and feeding system 23 feeds the combined feed 25 and carrier gas 54 into the gasifier reaction chamber 13 via stream 59 and the gasifying agent (e.g. $O_2$) 60 and water 61 (either as steam or as liquid water) via stream 62. Alternatively, the gasifier feed metering and feeding system 23 feeds the oxygen 60 into the gasifier via stream 62 and the water (either steam or liquid water) via a separate, third stream (not shown).

The combined first stage feed 25, the carrier gas 54, the water 61 and the oxygen 60 react at high temperature and pressure inside the gasifier reaction chamber 13 to produce the first syngas 14, which passes downwards into the gasifier plenum chamber 63 along with molten ash particles and a very small amount of ungasified coal particles. From the plenum chamber 63, a small portion of syngas is drawn downwards into the first quench chamber 64 in order to drag the majority of the molten ash and ungasified coal particles along with it into the first quench chamber 64. Inside the first quench chamber 64, the hot gas and particles are quenched and separated from each other. The quenched ash particles, which is known as slag, and some ungasified coal particles exit the bottom of the first quench chamber via slag stream 65. The small portion of quenched syngas exits the side of the first quench chamber to form first quenched syngas stream 57, which is routed to the gas conditioning and compression section for use in feeding the combined first stage feed 25 to the gasifier. Alternatively, the first quenched syngas stream 57 may be sent off site for use as a fuel or as a feedstock for synthesizing chemicals, hydrogen or liquid fuels. The majority of the syngas in the plenum chamber 13 and some remaining molten ash and ungasified coal particles are directed into the knockout (KO) internals 68 of the particulate removal section 18. From the KO internals 68, a second small portion of syngas is drawn downwards into the second quench chamber 70 in order to drag the remainder of the molten ash and ungasified coal particles along with it into the second quench chamber 70. Inside the second quench chamber 70, the hot gas and particles are quenched and separated from each other. The quenched ash particles, which are known as slag, and the remaining ungasified coal particles exit the bottom of the second quench chamber via slag stream 65. The small second portion of quenched syngas exits the side of the second quench chamber to form second quenched syngas stream 58, which is routed to the gas conditioning and compression section for use in feeding the combined first stage feed 25 to the gasifier. Alternatively, the second quenched syngas stream 58 may be sent off site for use as a fuel or as a feedstock for synthesizing chemicals, hydrogen or liquid fuels. The majority of the syngas in the KO internals 68 of the particulate removal section 18 passes upwards through a connector 151 and into the fluidized bed reactor 51 of the raining bed reactor system 16 as the portion 52 of the first syngas stream 14 that drives the additional syngas generation reactions within the raining bed reactor system 16.

Figure 2:
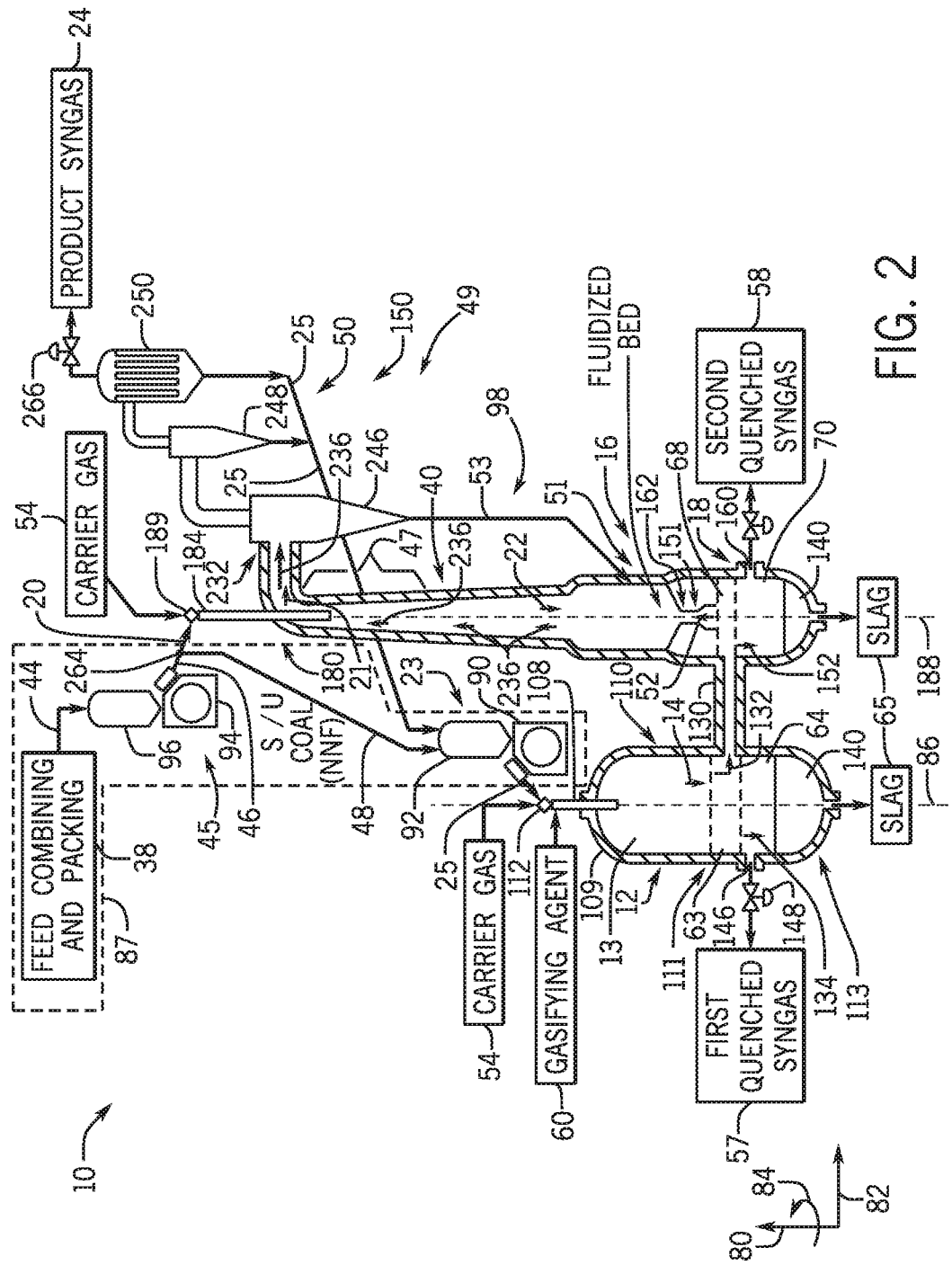
FIG. 2 is a schematic diagram of an embodiment of the gasification system of FIG. 1 in which the raining bed reactor system includes a gas-solids separation section having two cyclones and a filter.
Figure 3:
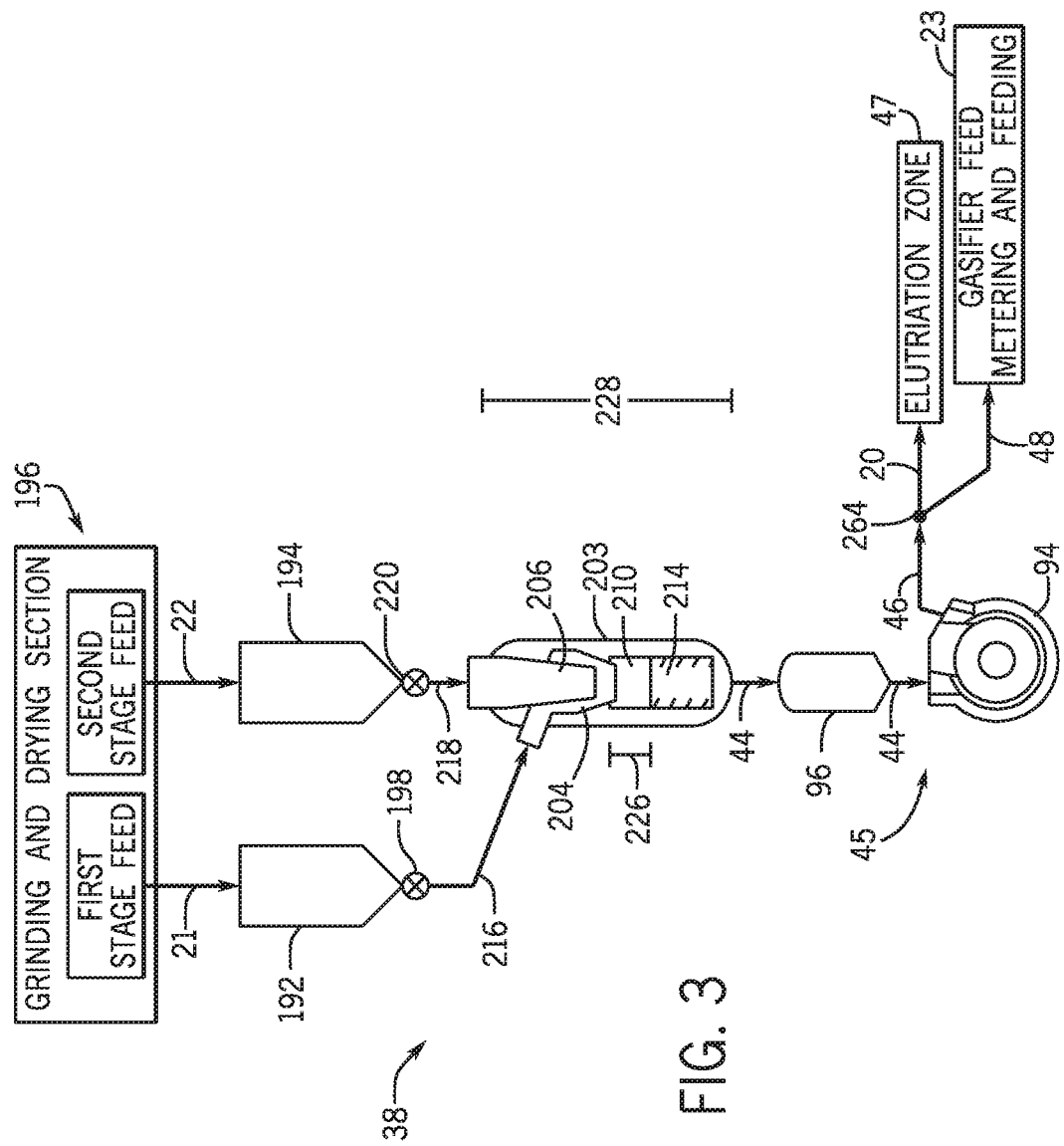
FIG. 3 is a schematic diagram of an embodiment of a feedstock combining and packing system that may be used with the gasification system of FIG. 2.

FIG. 2 is a schematic diagram of an embodiment of the gasification system 10. Various aspects of the gasification system 10 may be described with reference to an axial direction or axis 80, a radial direction or axis 82, and a circumferential direction or axis 84. For example, the axis 80 corresponds to a longitudinal centerline 86 or lengthwise direction, the axis 82 corresponds to a crosswise or radial direction relative to the longitudinal centerline 86, and the axis 84 corresponds to the circumferential direction about the axial axis 80 (e.g., longitudinal centerline 86). The gasification system 10 receives the combined first stage and second stage feed 44 from the feed combining and packing system 38, which is part of the gasification unit feed system 87. (Note that, for the sake of compactness of FIG. 2, the dashed line which defines the gasification unit feed system 87 encloses only some of the elements (38, 45, 23) of the raining bed reactor feed system 19 and the gasifier feed system 23 shown in FIG. 1. The feed combining and packing system 38, which is shown as a labeled box in FIG. 1, is shown in the same way on FIG. 2. More details are shown in FIG. 3. The gasifier feed metering and feeding system 23 of FIG. 1 comprises a first Posimetric Feeder 90 and a first Posimetric Feeder feed vessel 92. The feed vessel 92 functions as a surge vessel that ensures that the suction of the first Posimetric Feeder 90 is always filled. The pressurizing and feeding system 45 of FIG. 1 comprises a second Posimetric Feeder 94 and a second Posimetric Feeder feed vessel 96. The feed vessel 96 functions as a surge vessel that ensures that the suction of the second Posimetric Feeder 94 is always filled. The first and second Posimetric Feeders are essentially solids pumps, i.e. rotary disk type solids pressurizing feeders, which are manufactured by General Electric Company of Schenectady, N.Y. The term "Posimetric" is a trademark of General Electric Company and/or its affiliates. As should be noted, any other suitable solids pressurizing feeders may be used to pressurize and feed the coal feed to the gasifier 12 and the raining bed reactor 98. The second Posimetric Feeder 94 is designed to both meter coal feed and pressurize it from atmospheric pressure to the high operating pressure of the two-stage gasification system 10. The first Posimetric Feeder 90 also operates at high pressure, but is designed primarily to meter coal feed into the gasifier 12.) (Because the second Posimetric Feeder 94 pressurizes the feed for both the gasifier 12 and the raining bed reactor 98, the first Posimetric Feeder 90 only needs to overcome the pressure drop through the gasification system 10 from the inlet of the first feed injector 108 to the discharge of the escaped solids separation system 50 and the first feed vessel 92.) The gasifier 12 may include a pressure vessel 109 (e.g., a cylindrical vessel) that may act as an enclosure that functions as a pressure housing or outer casing for the gasifier 12. The vessel 109 encloses the reaction chamber 13 (e.g., a first stage reaction zone) in an upper cylindrical shell portion 110, the plenum chamber 63 in a middle cylindrical shell portion 111 of the gasifier 12, and a first quench chamber 64 in a lower cylindrical shell portion 113.

During normal operation of the gasification system 10, a first feed injector 108 aligned with centerline axis 86 supplies the reaction chamber 13 with the combined first stage feed 25 consisting of the first stage feed 21 plus the fine, partially reacted particles of the second stage feed 22 along with the gasifying agent 60 (e.g., oxygen ($O_2$)). In certain embodiments, a carrier gas 54 may be supplied along with the combined first stage feed 25 to a first mixing device 112 fluidly coupled to the first Posimetric Feeder 90 and to the first feed injector 108 to facilitate a flow of the combined first stage feed 25 into the reaction chamber 13. In addition to the combined first stage feed 25, the gasifying agent 60, and carrier gas 54, the first feed injector 108 may supply the reaction chamber 13 with a gasifier moderator 61 (not shown) such as steam or liquid water.

In the reaction chamber 13, the combined first stage feed 25, gasifying agent 60, and in certain embodiments, the moderator 61 (not shown) and carrier gas 54, react at high temperature and pressure to generate the first syngas 14, as discussed above with reference to FIG. 1. The first syngas 14 may have a temperature of between approximately 1090° C. (2000° F.) and approximately 1650° C. (3000° F.) and contain small amounts of entrained particles of partially reacted combined first stage feed 25, molten ash, and mixtures thereof. Following gasification of the combined first stage feed 25, the resultant syngas (e.g., the first syngas 14) is directed to the plenum chamber 63. In the plenum chamber 63, the first syngas 14 is partitioned between the first quench chamber 64 and a syngas transfer line 130 (e.g., passage, conduit). For example, the plenum chamber 63 is configured to partition the first syngas 14 such that a ratio of a first syngas portion 132 to a second syngas portion 134 is between approximately 100:1, 50:1, 20:1, 10:1, 5:1, 1:1, or any other desirable ratio.

The second syngas portion 134 includes greater than approximately 80 to 90% of the particulates (molten ash and small quantities of partially reacted combined first stage feed 25) entrained in the first syngas 14 exiting the reaction chamber 13. The particulates in the second syngas portion 134 are quenched in a pool of quench water 140 in the lower cylindrical portion 113, thereby forming the slag mixture 65 (e.g., quenched molten ash plus small amounts of unreacted combined first stage feed 25). The slag mixture 65 may be processed in a slag processing system downstream of the gasifier 12 (not shown). In addition to the slag mixture 50, the first quench chamber 64 generates a first quenched syngas 57. The first quenched syngas 57 exits the first quench chamber 64 through a first quench chamber opening 146 (e.g., via a nozzle). A valve 148 may control a flow and/or direct the first quenched syngas 57 to other components of the system 10. For example, in one embodiment shown in FIG. 1, the first quenched syngas 57 may be conditioned to remove entrained fine particulates and moisture, compressed and recycled to the gasification process for use as carrier gas. For example, the conditioned, compressed and recycled first quenched syngas may be used as the carrier gas 54 for the first combined stage feed 25 to the gasifier 12. Alternatively, it may be used as the carrier gas 54 for the combined first and second stage feed 20 to the raining bed reactor system 16. In another embodiment, the valve 148 may direct the first quenched syngas 57 toward the product syngas 24 such that the first quenched syngas 57 stream and the product syngas 24 stream are combined downstream of the raining bed reactor system 16. In a still further embodiment, the valve 148 may direct the first quenched syngas 57 towards other processing units where the first quenched syngas may serve as a feedstock for the production of chemicals, hydrogen or electrical power.

As discussed above, the second syngas portion 134 generated in the plenum chamber 63 includes greater than approximately 80 to 90% of the particulates entrained in the first syngas 14. Therefore, the first syngas portion 132 has a decreased particle loading (e.g., less than approximately 10 to 20%). The syngas transfer line 130 is fluidly coupled to a slag knock out pot (SKOP) 18, which functions as a second stage particulate knockout in conjunction with the plenum chamber 63 and first quench chamber 64 to complete removal of any remaining entrained particulates in the first syngas portion 132. Taken together, the plenum chamber 63 and first quench chamber (first stage particulate removal) and the SKOP 18 (second stage particulate removal) comprise the two-stage particulate removal system described in relation to FIG. 1. The SKOP 18 comprises a set of slag knockout (KO) internals 68, a second quench chamber 70 and a connector 151 to the bottom inlet of the fluidized bed reactor 51 of the raining bed reactor system 16. Similar to the plenum chamber 63, the SKOP internals 68 direct a third syngas portion 152 of the first syngas portion 132 to a second quench chamber 70 disposed within the SKOP 18 and a fourth syngas portion 52 of the first syngas portion 132 toward the raining bed reactor system 16. For example, the KO internals 68 are configured to partition the first syngas portion 132 such that a ratio of the fourth syngas portion 52 and the third syngas portion 152 is approximately 100:1, 50:1, 20:1, 10:1, 5:1, 1:1, or any other desirable ratio. The second quench chamber 70 also includes quench water 140 that facilitates removal of the remaining particulates as the slag mixture 65 and generates a second quenched syngas 58. The second quenched syngas 58 exits the SKOP 18 via a nozzle disposed in a second quench chamber opening 160. The second quenched syngas 58 may be combined with the product syngas 24, the first quenched syngas 57, or a combination thereof. In certain embodiments, the second quenched syngas 58 is not combined with the product syngas 24 or the first quenched syngas 57. Rather, the second quenched syngas 58 is processed separate from the syngas 24, 57 before being recycled and reused elsewhere in the gasification process and/or directed to other industrial processes for use as a fuel gas or a gaseous feedstock for the manufacture of chemicals, hydrogen or liquid fuels.

The fourth syngas portion 52, which is substantially free of particulates (e.g., has less than approximately 5%, 2%, 1%, 0.5% or 0.1% of the particulates originally entrained in first syngas 14), is directed to the fluidized bed reactor 51 of the raining bed reactor system 16 (e.g., the second stage of the two-stage gasification system) via syngas inlet 162, and provides heat for gasification of additional feedstock 26 supplied to the raining bed reactor system 16. The raining bed reactor 98 within the raining bed reactor system 16 includes, from top to bottom, an elutriation zone 47, the tapered raining bed reactor column 40, and a fluidized bed reactor 51. The tapered raining bed reactor column 40 is disposed downstream of the fluidized bed reactor 51 (from the perspective of the flow direction of fourth syngas portion 52) and is fluidly coupled to the fluidized bed reactor 51. The elutriation zone 47 is disposed downstream of the tapered raining bed reactor column 40 (from the perspective of the flow direction of fourth syngas portion 52) and is fluidly coupled to the tapered raining bed reactor column 40. A second feed injector 184, aligned coaxially with the vertical axis 188 of the raining bed reactor 98, has its downward-facing exit orifice positioned in the middle (from top to bottom) of the elutriation zone 47 such that the second feed injector 184 supplies the middle of the elutriation zone 47 with the combined first and second stage feed 20. In this way, as the combined first and second stage feed 20 exits the second feed injector 184, the combined flow initially moves in a direction substantially opposite (e.g., counter flow) to the flow direction of the fourth syngas portion 52 exiting the SKOP 18. However, under the influence of the aerodynamic forces operating within the elutriation zone 47, the finer particles of the first stage feed 21 are dragged upwards by the upward flowing syngas in the direction of the coarse solids separation section 49 (i.e. first cyclone 246) and the escaped solids separation section 50 (i.e. second cyclone 248 and filter 250) which, together, comprise the gas-solids separation system 150. In contrast, the coarser particles of the second stage feed 22 "rain down" inside the tapered raining bed reactor column 40 against the upward flow of the fourth syngas portion 52. In this way, the fourth syngas portion 52 transfers heat to the second stage feed 22 and that heat gasifies the second stage feed 22 via the well-known endothermic gasification reactions and generates additional syngas that combines with the fourth syngas portion 52 to produce a raw product syngas 236 which, when all the particulates have been removed, becomes the final, clean product syngas 24. Therefore, an amount of gasifying agent 60 (e.g., $O_2$) required to generate a unit of syngas (e.g., the product syngas 24) may be reduced compared to single stage gasification systems (e.g., systems that do not include a second reactor). As such, because the second stage 16 of the two-stage gasification system 10 recovers thermal energy from the first syngas 14 (e.g., the fourth syngas portion 52) generated during the first stage gasification (e.g., in the gasifier 12) as chemical energy of the product syngas 24 generated in the raining bed reactor system 16, the gasification efficiency of the gasification system 10 may be increased.

Similar to the first feed injector 108, the second feed injector 184 may be aligned with a centerline axis 188 of the raining bed reactor 20. The second feed injector 184 receives the combined first stage and second stage feed 20 (i.e. the combined coarse, second stage feed 22 and the fine, first stage feed 21) from the raining bed reactor feed preparation section 19 (shown in FIG. 1), and supplies the combined feed 20 to the elutriation zone 47 of the raining bed reactor 98. Because of its geometrical configuration, the raining bed reactor system 16 has a longer gasification residence time compared to the gasifier 12. Therefore, the average particle size of the coarse second stage feed 22 may be larger than the average particle size of the fine, first stage feed 21. That is, because the coarse, second stage feed 22 has more time to react within the raining bed reactor system 16 (e.g., increased residence time), the second stage feed 22 may have large, coarse particles that do not react as quickly as the small, fine particles in the first stage feed 21. As such, due, in part, to the larger average particle size of the coarse, second stage feed 22 compared to the first stage feed 21, grinding energy for the coarse, second stage feed 22 may be decreased. In addition, the coarse second stage feed 22 may be supplied as dry feed to the raining bed reactor 98, thereby reducing energy consumption associated with removal of excess water associated with feed slurries. Therefore, the decrease in the overall energy requirements of the gasification system 10 results in an increase in the efficiency of the gasification system 10 compared to other gasification systems that do not include the gasifier 12 and the raining bed reactor system 16 configuration.

As discussed in further detail below, the feed system 87 supplies the raining bed reactor system 16 with the combined first stage and second stage feed 20. Combined feed 20 is pressurized and mixed with the carrier gas 54 in a second mixing device 189 fluidly coupled to the second Posimetric Feeder 94 and to the second feed injector 184. The carrier gas 54 may include $N_2$, $CO_2$, natural gas, syngas (e.g., the quenched syngas 57, 58), or any other suitable gas for conveying the combined feed 20 into the raining bed reactor 20. The flow rate of the carrier gas 54 delivered to the second mixing device 189 may be controlled such that a minimum amount of the carrier gas 54 is mixed with the combined feed 20 to assist in a steady and reliable flow of the combined feed 20 through the second feed injector 184. For example, the flow rate of the carrier gas 54 supplied to the second mixing device 189 may be just enough to overcome the resistance to flow of the particles through the feed injector 184. Limiting an injection velocity of the combined first and second stage feed 20 flowing into the raining bed reactor 98 accomplishes two things. First, it ensures that the combined feed 20 is not injected at high velocities that carry it beyond the bottom of the elutriation zone 47. This enhances the ability of the raining bed reactor column 40 raw product syngas 236 rising through the elutriation zone 47 to separate the finer, first stage feed 21 from the combined feed 20 and to carry those finer particles overhead and out of the elutriation zone 47. The raw product syngas 236 then carries the elutriated first stage feed 21 particles through the coarse solids separation cyclone 246 and into the fine, escaped solids separation cyclone 248 and the escaped solids filter 250 where those particles are separated from the raining bed reactor 98 raw product syngas 236 and directed towards the gasifier 12. Second, limiting an injection velocity of the combined feed 20 into the elutriation zone 47 avoids imparting too high of an initial velocity to the coarser, second stage feed particles 22 so that the primary driving force for the downward flow of those particles is gravity. Unlike the smaller, lighter particles of the first stage feed 21 which are easily reversed in their flow direction by the rising syngas 236 within the elutriation zone 47, the larger, heavier particles of the second stage feed 22 continue in their initial downward trajectory at a velocity that approximately equals the terminal velocity of the particles inside the raining bed reactor 98 minus the velocity of the upwardly rising syngas 52, 236 within the reactor. The upwardly rising syngas 52, 236 imparts a drag force on the falling particles 22 that slows them down and reduces their gravity-driven downward velocity. Accordingly, a residence time of the second stage feed particles 22 in the raining bed reactor 98 may be increased, thereby facilitating gasification of the larger (e.g., coarser) feed particles comprising the second stage feed 22. In certain embodiments, the carrier gas 54 may not be used. In this particular embodiment, a simple delivery tube, rather than the second injection nozzle 184, may be used to deliver the combined feed 20. In that case, the driving force for the flow of the combined feed 20 through the delivery tube and into the raining bed reactor 98 is gravity alone. As the second stage feed 22 particles rain downwards through the tapered raining bed reactor column 40 and eventually enter the fluidized bed reactor 51, they absorb heat and gasify via endothermic gasification reactions. As the coal particles gasify, they lose both mass and diameter. At some point they become small enough and light enough that the rising syngas is able to carry them back up the tapered raining bed reactor column 40 and up through the elutriation zone 47 to the coarse solids separation cyclone 246. Some of the partially reacted second stage feed 22 particles may be small enough to pass through the cyclone and leave the overhead of cyclone 246 along with the elutriated fine particles of the first stage feed 21. However, many may still be too large to follow that path and so will pass through the bottom of cyclone 246 to be returned to the fluidized bed reactor 51 via the raining bed reactor return leg 53. But eventually, even the largest of the second stage feed 22 particles gasify sufficiently that they become small enough and light enough to not only be carried back up to the elutriation zone 47, but also to pass through the overhead of the coarse solids separation cyclone 246 to the escaped solids separation cyclone 248 and the escaped solids filter 250 where they are removed from the raw product syngas 236 along with the elutriated fine particles of the first stage feed 21. The partially reacted second stage feed 22 particles and the elutriated first stage feed 21 particles then flow as a combined first stage feed 25 into the first Posimetric Feeder feed vessel 92. The first Posimetric Feeder feed vessel 92 supplies the combined first stage feed 25 to the first Posimetric Feeder 90 which, in turn, supplies the combined feed 25 to the first feed injector 108 and the gasifier 12. In the gasifier 12, the combined first stage feed 25 consisting of the first stage feed 21 and the partially reacted coal particles of the second stage feed 22 gasify to generate the first syngas 14 which, after particulate removal in the two-stage particulate removal process, becomes the fourth portion 52 of the first syngas 14 which enters the bottom of the fluidized bed reactor 51 of a tapered raining bed reactor 98.

FIG. 3 is an embodiment of the gasification unit feed system 87 of FIG. 2 illustrating the feed combining and packing system 38 and the pressurizing and feeding system 45 that supplies either the combined first stage and second stage feed 20 to the elutriation zone 47 of the raining bed reactor 98 during normal operation or the first stage feed 48 to the gasifier feed metering and feeding system 23 during startup. The feed combining and packing system 38 is configured to combine (e.g. thoroughly mix) and pack (e.g. minimize void spaces between coal particles) the first stage feed 21 with the second stage feed 22 to generate a combined feed 44. The combined and packed feed 44 is then sent to the pressurizing and metering system 45 in which the second Posimetric Feeder 94 pressurizes the combined feed 44 to generate a pressurized combined feed 46 which, by virtue of the metering capability of the Posimetric Feeder, is then fed as the combined first stage and second stage feed 20 to the elutriation zone 47 during normal operation or as the first stage feed 48 to the gasifier feed metering and feeding system 23 during startup. The feed combining and packing system 38 includes a first stage feed bin 192 and a second stage feed bin 194 that store the two feeds 21, 22 respectively. Prior to storing the feeds 21, 22 in their respective feed bins 192, 194, the feeds 21, 22 may be prepared by grinding to their desired particle size distributions $PSD_1$ and $PSD_2$, respectively, and drying to their target moisture contents $MC_1$ and $MC_2$, respectively, in a grinding and drying section 196 of the raining bed reactor feed system 19.

The grinding and drying section 196 may be configured to grind the feedstock 26 to generate the first stage feed 21 having a first particle size distribution ($PSD_1$) suitable for gasification in the reaction chamber 13 of the gasifier 12 (e.g., the first stage of gasification), as illustrated in FIG. 4. In addition, the grinding and drying section 196 may grind the feedstock 26 to generate the second stage feed 22 having a second particle size distribution ($PSD_2$) suitable for gasification in the tapered raining bed reactor 98 of the raining bed reactor system 16 (e.g., the second stage of gasification). As illustrated in FIG. 4, the second stage feed 22 has a larger (e.g., coarser) $PSD_2$ compared to the $PSD_1$ of the first stage feed 21. In addition, the $PSD_2$ for the second stage feedstock 22 may be narrower than the $PSD_1$ of the first stage feedstock 21. The difference in PSD for the feeds 21, 22 is due, in part, to the difference in residence times between the gasifier 12 and the raining bed reactor system 16. Relatively speaking, if the residence time inside the gasifier reaction chamber 13 is represented by T, the residence time inside the raining bed reactor system 16 may be 1.1T, 2T, 5T 10T, 20T or 50T. Because the residence time inside the gasifier reaction chamber 13 is short, a majority, 90% or 100% of the particles of the first stage feed 21 may be smaller than 1 mm in diameter. But because the residence time inside the raining bed reactor system is generally much longer, a majority, 90% or 100% of the particles of the second stage feed 22 may be larger than 1 mm in diameter.

A first stage feed metering device 198 controls a desired flow rate of the first stage feed 21 and directs the metered feed 21 to a feed combining and packing device 203 that is fluidly coupled to both the feed bins 192, 194. The feed combining and packing device 203 is a vessel (e.g., a cylindrical vessel) that houses a fine solids annular combining nozzle 204, a coarse solids central combining nozzle 206, a packing chamber 210, and a rotating feed channel 214. As illustrated, the fine solids annular combining nozzle 204 encircles (e.g., surrounds) the coarse solids central combining nozzle 206. However, in other embodiments, the nozzle 204 is not annular and does not surround the nozzle 206. In further embodiments, the annular nozzle 204 is in fluid communication with the coarser, second stage feed 22 and serves as a coarse solids annular combining nozzle and the central nozzle 206 is in fluid communication with the finer, first stage feed 21 and serves as a fine solids central combining nozzle. As shown in FIG. 3, the fine solids annular combining nozzle 204 receives the first stage feed 21 from the first stage feed bin 192, as illustrated by arrow 216, and the coarse solids central combining nozzle 206 receives the second stage feed 22 from the second stage feed bin 194, as illustrated by arrow 218. Similar to the first stage feed 21, the second stage feed 22 is measured via a second stage feed metering device 220 disposed downstream of the second stage feed bin 196.

The nozzles 204 and 206 guide the feeds 21 and 22, respectively into the packing chamber 210. The packing chamber 210 is configured to combine and thoroughly mix the feeds 21, 22 to generate the combined first stage and second stage feed 44 at the exit of the feed combining and packing device 203. The packing chamber 210 may include one or more vibrators to facilitate mixing of the feeds 21, 22. For example, the one or more vibrators may enable the smaller/finer feed particles (e.g., the first stage feed 21) to fill the interstitial spaces between the larger/coarser feed particles (e.g., the second stage feed 22) such that the combined feed 44 has well-mixed and closely packed fine and coarse coal particles. The one or more vibrators may be internal (e.g., disposed within the packing chamber 210), external (e.g., disposed outside the packing chamber 210), or a combination thereof. A first length 226 of the packing chamber 210 may be between approximately 25% and approximately 75% of a second length 228 of the feed combining and packing device 203 to allow ample mixing of the feeds 21, 22 and to generate the combined feed 44 having a desired mixing and packing of the feed particles. The combined and packed feed is moved out of the feed combining and packing device 203 by rotating feed channel 214. In certain embodiments, the feed channel 214 may be an actively rotating channel with internal surface features that assist the movement of the combined feed 44 out of the feed combining and packing device 203 and into the downstream surge vessel 96. For example, the internal surface features may include one or more spiral projections running the length of the rotating channel 214, wherein the spiral projections are oriented in such a way as to provide a positive force for the movement of feed 44 through the channel and into the downstream surge vessel 96.

The operation of the metering devices 198 and 220 may be controlled in such a manner as to control a ratio of the first stage feed 21 to the second stage feed 22 in the combined feed 44, which has a third particle size distribution ($PSD_3$) that is a weighted combination of $PSD_1$ and $PSD_2$, wherein the weighting is determined by the ratio of the flow rate of first stage feed 21 to the flow rate of second stage feed 22. FIG. 5 illustrates an exemplary $PSD_3$ curve for the combined feed 44 exiting the feed combining and packing device 203, which represents a combination of the individual PSD curves 21, 22 shown in FIG. 4. As shown in FIG. 4, the maximum of the $PSD_2$ curve appears higher than the maximum of the $PSD_1$ curve when plotted on the same particle size frequency of occurrence scale. However, in FIG. 5, the portion 277 of the $PSD_3$ curve attributable to the second stage feed particles now has a lower maximum than the portion 59 of the $PSD_3$ curve attributable to the first stage feed particles. This may happen, for example, when the relative flow rate of first stage feed 21 through the packing chamber 210 is higher than the flow rate of the second stage feed 22 through the packing chamber 210. In such cases, the PSD of the higher flow rate stream may dominate the final overall PSD of the combined stream. The shape of the $PSD_3$ of the combined feed 44 exiting the feed combining and packing device 203 may be manipulated using the raining bed reactor feed preparation, pressurization and feeding system 19 in order to account for the reactivity of the feedstock 26, the PSD for each feed stage 21, 22 (e.g., $PSD_1$ and $PSD_2$), and the size and geometries of the gasifier 12 and the raining bed reactor system 16. Following mixing and packing of feeds 21, 22, the resultant combined feed 44 flows through the feed channel 214 and into the second Posimetric Feeder feed vessel 96 of the pressurizing and feeding system 45. The feed vessel 96 functions as a surge volume that ensures that the inlet to the second Posimetric Feeder 94 is always full of solids. The Posimetric Feeder 94 pressurizes and meters the combined feed 44 to produce a pressurized and metered combined feed 46. Depending on the orientation of the internals of flow diverter 264, the pressurized and metered combined feed may be sent as the combined first and second stage feed 20 to the elutriation zone 47 of the raining bed reactor 98 during normal operation or it may be sent as the first stage feed 48 to the gasifier feed metering and feeding system 23 during startup of the two-stage gasification system 10.

Combining (e.g., mixing) the first stage feed 21 with the second stage feed 22 allows the second stage feed 22 to be continuously fed into the raining bed reactor system 16 using a solids pump such as the Posimetric Feeder. Typical operating pressures for both the gasifier 12 and the raining bed reactor system 16 range from approximately 2 MPa to approximately 9.5 MPa. By itself, the second stage feed 22 could not be continuously fed into such a high pressure environment. The reason for this is that the second stage feed 22 is specifically tailored to have a coarser and narrower particle size distribution ($PSD_2$) than the first stage feed 21 in order to take advantage of the much longer residence time of the raining bed reactor system 16. The longer residence time allows the grinding and drying energy required to prepare the second stage feed 22 to be significantly reduced compared to that required for the first stage feed 21. The disadvantage of this coarser and narrower $PSD_2$ of the second stage feed 22 is that there may be many large interstitial spaces between the particles. If fed through the solids pump 94 by itself, the second stage feed 22 would allow significant leakage of gas from the raining bed reactor system 16 back to the inlet of the pump 94 via the large, interconnected interstitial spaces between particles. Thus, the solids pump 94 would not be able to develop the required pressure differential between its inlet and its outlet needed to pressurize the second stage feed 22 into the raining bed reactor 98. However, when combined with the first stage feed 21, the finer particles of the first stage feed fill in the interstitial spaces between the coarser second stage feed particles 22 so that a very low porosity column of particles of the combined feed 44 is transported through the solids pump 94. This low porosity column of closely packed particles from both the first and second stage feeds is able to sustain a very high pressure gradient between the suction and the discharge of the pump 94 because the high pressure gas in the raining bed reactor 98 has very few and very tiny passageways through the combined feed 44 by which it may leak back to the suction of the pump 94. Thus, by combining (e.g. thoroughly mixing) the second stage feed 22 with the first stage feed 21, the second stage feed may be continuously fed into the high pressure raining bed reactor 98. An additional advantage of combining the second stage feed 22 with the first stage feed 21 is that both the gasifier 12 and the raining bed reactor system 16 (both first and second gasification stages) may be simultaneously supplied with pressurized feed using only one high pressure solids pump 94.

Returning to FIG. 2, the second feed injector 184 feeds the combined first stage and second stage feed 20 to the elutriation zone 47 of the raining bed reactor 98. While in the elutriation zone 47, the smaller and less dense particles in the combined feed 20 (e.g., those from the first stage feed 21) are aerodynamically separated from the larger and more dense particles (e.g., those from the second stage feed 22) by an upward flow of the raining bed reactor raw product syngas 236. (The raw product syngas 236 is a combination of the fourth syngas portion 52 that enters the bottom of the fluidized bed reactor 51 via opening 162, the additional syngas that is generated within the raining bed reactor system 16 as a result of the gasification of the second stage feed 22 and partially reacted particles of the second stage feed 22. The syngas is "raw" in the sense that it has not yet been cleaned to remove particulates.) For example, if a flow velocity of the raining bed reactor raw product syngas 236 within the elutriation zone 47 is greater than a terminal velocity of the smaller particles and lower than a terminal velocity of the larger particles, the smaller (e.g., fine) particles will be moved upward (e.g., toward an exit 232 of the elutriation zone 47), and the larger (e.g., coarse) particles will move downward (e.g., via gravity) at a rate that is reduced by a drag resulting from the upward flow of the raining bed reactor raw product syngas 236. Separation of the fine and coarse particles of the combined feed 20 within the elutriation zone 47 enables the use of a single solids pump 94 to simultaneously deliver pressurized fuel (e.g., the first stage feed 21 and the second stage feed 22) to separate reactors (e.g., the gasifier 12 and the raining bed reactor system 16), wherein the fuel delivered to each reactor is specifically tailored for the operating characteristics of that reactor.

The fine particles from the first stage feed 21 elutriate from the combined feed 20 and flow parallel (co-current) with second stage raw product syngas 236. Likewise, partially reacted particles of the second stage feed 22 which, through the loss of mass and diameter that comes as a result of reaction, have become small enough to be entrained out through the exit 232 of the elutriation zone 47, also flow in parallel with the raw product syngas 236. The second stage raw product syngas 236 flows into a gas-solids separation section 150, carrying with it the fine particles of the first stage feed 21 and the partially reacted particles of the second stage feed 22. The gas-solids separation section 150 includes a series of separation devices (e.g., cyclones, filters, or any other suitable separation devices) that separate all of the as yet unreacted fine particles comprising the first stage feed 21 plus the fine and medium size, partially reacted second stage feed 22 particles exiting the raining bed reactor 98 from the second stage raw product syngas 236 to generate the final product syngas 24 that is substantially free of particles. For example, the gas-solids separation section 150 includes a first cyclone 246 configured to remove medium sized partially reacted second stage feed 22 particles for return to the fluidized bed reactor 51 via the raining bed reactor return loop 53 and a second cyclone 248 configured to remove unreacted first stage feed 21 particles and fine partially reacted second stage feed 22 particles in order to clean the second stage raw product syngas 236 and to produce a particle free product syngas 24. In addition, in certain embodiments, the gas-solids separation section 150 includes a filter 250 that may capture any remaining fine particles (e.g., unreacted first stage feed 21 particles and partially reacted second stage 22 feed particles) that may not have been removed in the cyclones 246, 248, thereby ensuring a substantially particle-free product syngas 24. Non-limiting examples of the filter 250 may include ceramic candle filters, ceramic cross-flow filters, sintered metal candle filters, moving granular bed filters, or any other suitable filtering device configured to function as an absolute barrier filter capable of removing essentially all remaining particles from the product syngas 24. Though not shown, those skilled in the art will appreciate that the filter 250 may employ one or more streams of back-pulsing gas such as nitrogen or carbon dioxide to periodically remove the cake of filtered particulates that accumulates over time on the upstream surfaces of the filter elements. The medium size partially reacted second stage 22 feed particles from the first cyclone 246 are returned to the reactor 98 for further gasification via raining bed reactor return loop 53. Similarly, the fine partially reacted second stage 22 feed particles and the as yet unreacted first stage feed 21 particles separated in the second cyclone 248 and filter 250 are directed to the gasifier feed metering and feed system 23 and fed to the gasifier 12 as the combined first stage feed 25 via the first feed injector 108.

The gasifier feed system 23 includes a solids pump feed vessel 92 and a solids pump 90. The solids pump feed vessel 92 receives the combined first stage feed 25 comprising first stage feed 21 particles and extensively reacted second stage feed 22 particles, both of which are separated from the second stage raw product syngas 236 by the second cyclone 246 and the filter 248. By the nature of the way cyclones work, cyclone 248 delivers a steady stream of particles to solids pump feed vessel 92. However, the particles removed by the filter 250 flow to the feed vessel 92 via line 25 in pulses that are generated each time the filter 250 is back pulsed with gas to remove accumulated filter cake from the upstream surfaces of the filter elements. Thus, the solids pump feed vessel 92 serves as a surge volume that smoothes out the flow of particulates from cyclone 248 and filter 250 and presents a steady stream of particulates to the inlet of solids pump 90. The gasifier feed metering solids pump 90 that is connected to the gasifier 12 differs from the combined feed pressurizing & metering solids pump 94 that is connected to the top of the raining bed reactor 98. Whereas solids pump 94 both pressurizes and meters the fresh, combined feedstock 20 into the top of the raining bed reactor 98, the gasifier feed metering solids pump 90 primarily meters the first stage feed 21 into the gasifier 12 while providing only as much pressurization as is needed to transport the particulates captured by the second cyclone 248 and the barrier filter 250 into the gasifier 12. The combined gasifier feed 25, which consists of unreacted first stage feed 21 particles plus the partially (extensively) reacted second stage feed 22 particles removed from the raw second stage syngas 236, is metered by the first solids pump 90 into a mixing device 112 immediately upstream of the gasifier feed injector 108. In the mixing device 112, the combined gasifier feed 25 is mixed with a stream of carrier gas 54 and conveyed into the top of the gasifier via the gasifier feed injector 108. The carrier gas may be nitrogen ($N_2$), carbon dioxide ($CO_2$), natural gas (NG), syngas, a gasification temperature moderator such as steam, or any other process gas suitable for use in conveying coal particles. High purity oxygen 60 is routed through a separate channel within the gasifier feed injector 108. At the exit plane of the gasifier feed injector 108, the gasifier feed injector geometry is configured to thoroughly mix and inject the oxygen and the pneumatically-conveyed particulate feed into the top of the gasifier reaction chamber 13. Inside the reaction chamber, the oxygen 60, carrier gas 54 and particulate feed 20 react at high temperature and high pressure to produce the first syngas 14. The hot, raw, first stage syngas is then cleaned of particles, first in the plenum chamber 63 and then in the slag knockout pot 18, prior to entering the bottom of the fluidized bed reactor 51.

A flow diverter 264 in the raining bed reactor feed pressurization and feeding system 45 may direct a flow of the first stage feed 21 to the feed and metering system 23 during startup. For example, during start-up of the gasification system 10, the raining bed reactor system 16 is not supplied with the combined first stage and second stage feed 20 because the gasifier 12 has not generated the first syngas 14 that is used to drive gasification of the second stage feed 20 in the raining bed reactor system 16. Therefore, a flow of the first stage feed 21 may be diverted to bypass the raining bed reactor system 16 so that it flows directly to the gasifier 12 from the raining bed reactor feed system 19 rather than flowing through the elutriation zone 47 and the gas-solids separation section 150 before entering the gasifier 12. The flow of the first stage feed 21 may continue to be diverted via 264 until a sufficient flow rate of first syngas 14 is being generated so that the raining bed reactor system 16 can be operated properly. During start-up, both solids pumps 90, 94 operate at nearly atmospheric pressure. Once the first stage feed 21 is gasified in the gasifier 12 to generate the first syngas 14, a back pressure control valve 266, which may be operated in automatic control mode, remains closed to allow pressure to build up throughout the gasification system 10. As the pressure builds within the gasification system 10, the differential pressure generated by the second solids pump 94 also increases to ensure that first stage feed 21 continues to flow to the gasifier 12. Since the second solids pump 94 behaves like a positive displacement type pump, it will maintain its ability to pressurize and meter solids into the gasification system 10 even as the pressure in the gasification system 10 increases to its normal operating value.

As part of the startup process, the first solid pump feed vessel 92 is initially filled with first stage feed 21 so that later on during the startup process there is enough of a reserve volume of first stage feed 21 in the feed vessel 92 to continue to feed the gasifier 12 while the position of flow diverter 264 is changed to divert the flow of first stage feed 21 from the feed vessel 92 to the elutriation zone 47. In addition to allowing enough time for the position of the flow diverter 264 to be changed, the reserve volume also allows time for the first stage feed 21 to travel through the second feed injector 184, the elutriation zone 47 and the coarse solids cyclone 246, to be captured by the escaped solids cyclone 248 and filter 250 and to flow from the escaped solids cyclone and filter to the feed vessel 92. Thus, when the gasification system 10 is pressurized to its normal operating pressure, the position of flow diverter 264 is changed to direct the flow of the first stage feed 21 from the feed vessel 92 to the elutriation zone 47. Once the flow of captured first stage feed 21 particles is established from the escaped solids cyclone 248 and filter 250 to the feed vessel 92, the gasifier 12 can continue to operate at the normal operating pressure of the gasification system 10. Note that, once the normal operating pressure of the gasification system 10 has been reached, the back pressure control valve 266, which may be operated in automatic control mode, may begin to open and to control the flow of the product syngas 24 exiting the raining bed reactor system 16 in order to maintain the normal operating pressure of the gasification system 10. Once the normal operating pressure of the gasification system 10 has been reached and the normal operating flow path of the first stage feed 21 has been established (e.g. from solids pump 94 to feed injector 184 to elutriation zone 47 to cyclones 246, 248 and filter 250 and, ultimately, to feed vessel 92), the operation of the raining bed reactor feed system 19 may be altered in order to begin introducing second stage feed 22 into the feed combining and packing system 38 and the pressurizing and feeding system 45. The feed rates of both the first stage feed 21 and the second stage feed 22 are also slowly increased from their startup values (zero for the second stage feed 22) to their normal operating values. Once the gasification system 10 has reached its normal operating pressure, the normal operating ratio of the flow rate of the first stage feed 21 to the flow rate of the second stage feed 22 has been reached and the normal operating flow rates of both the first stage feed 21 and the second stage feed 22 have been reached, the gasification system 10 has been started up. Of course, those skilled in the art will appreciate that, while the foregoing operating objectives are achieved, the flow rates of oxygen 60 and carrier gas 54 and, in some embodiments, of gasifier moderator 61 (either steam or liquid water) are appropriately adjusted in order to maintain the desired gasifier 12 operating temperature and to generate the first syngas 14 with the desired composition.

As discussed above, the raining bed reactor feed system 19 grinds and dries the feedstock 26 to generate the first stage feed 21, the second stage feed 22 and the combined first stage and second stage feed 44. The raining bed reactor feed system 19 includes a number of units—the second stage feed grinding unit 28, the first stage feed grinding unit 34 and, in some embodiments, the second stage feed drying unit 284 and/or the first stage feed drying unit 42—which, together, are referred to as the grinding and drying section 196. In addition to the units comprising the grinding and drying section 196, the raining bed reactor feed system 19 also includes the feed combining and packing system 38, which combines the two feeds in the proper ratio, mixes the two feeds to ensure that the coarser particles of the second stage feed are well and evenly dispersed throughout the finer particles of the first stage feed and packs the finer particles of the first stage feed and the coarser particles of the second stage feed together so that void spaces between particles are minimized in order to support the ability of the first solids pump 94 to develop the required pressure differential from suction to discharge. The final system of the raining bed reactor feed system 19—the pressurizing and feeding system 45—takes the combined first stage and second stage feed 22 and pressurizes and meters it into the raining bed reactor 98. FIGS. 6-13 illustrate several configurations for the grinding and drying section 196 of the raining bed reactor feed system 19. For example, in FIGS. 6-8, the grinding and drying section 196 includes the first stage feed dryer 42 coupled to the first stage grinding unit 34 and a second stage feed dryer 284 coupled to the second stage grinding unit 28. Including the second stage feed dryer 284 may be desirable in embodiments in which additional drying of the second stage feed 22 is desired in order to reduce the water content in the overall gasification system 10, thereby decreasing the energy requirement for gasification of the second stage feed 22 in the reactor 98. In the embodiment illustrated in FIG. 6, each grinding unit 28, 34 receives the feedstock 26 from a feedstock pile/supply 286 and directs the ground feedstock (e.g., the first stage feed 271 and the second stage feed 30) to the respective feed dryer 42, 284. In other embodiments, the first stage grinding unit 34 does not receive the feedstock 26 from the feedstock pile 286, rather the first stage grinding unit 34 receives the first feedstock portion 32 from either the second stage grinding unit 34, as illustrated in FIG. 7, or the second stage dryer 284, as illustrated in FIG. 8.

In embodiments where the first and second stage grinding units 28 and 34, respectively, receive the feedstock 26 from the feedstock pile 286, the feedstock 26 supplied to the grinding units 28, 34 may be the same or different. For example, one grinding unit 28, 34 may receive petroleum coke/coal and the other grinding unit 28, 34 may receive biomass. The different feedstock 26 may be contained in separate feedstock piles 286 that are configured to feed the feedstock 26 to the respective grinding unit 28, 34 or may be combined into one feedstock pile 286.

In alternative embodiments, such as those illustrated in FIGS. 9-12, the grinding and drying section 196 does not include the second stage feed dryer 284. In these particular embodiments, the first stage grinding unit 34 receives either the feedstock 26 (see FIGS. 9 and 11) from a feedstock pile 286 (e.g., storage bin) or ground feed (e.g., the first feed portion 32) from the second stage grinding system 28 (see FIGS. 10 and 12). The first stage grinding unit 34 may feed the fine ground feed (e.g., the first stage feed 271) to the first stage feed dryer 284, as illustrated in FIGS. 9 and 10, or directly to the feed combining and packing system 38, as illustrated in FIGS. 11 and 12. In certain embodiments, the grinding and drying section 196 includes the second stage feed dryer 284 and does not include the first stage feed dryer 42, as illustrated in FIG. 13. In this particular embodiment, the second stage grinding unit 28 receives the feedstock 26 from the feedstock pile 286, grinds the feedstock 26 to generate the second stage feed 30, and directs the second stage feed 30 to the second stage feed dryer 284. The second stage feed dryer 284 is configured to direct the first feed portion 32 to the first stage grinding unit 34 and the second feed portion 22 to the feed combining and packing system 38. Configurations for the grinding and drying section 196 that feed the first stage grinding unit 34 with the first feed portion 32 generated in the second stage grinding unit 28 may be more cost effective than configurations where the first stage grinding unit 34 receives the feedstock 26 directly from the feedstock pile 286. This is due, in part, to the feedstock 26 being coarsely ground in the second stage grinding unit 28. As such, the grinding energy requirement for finely grinding the feedstock (e.g., the first feed portion 32) in the first stage grounding unit 34 may be decreased.

In other alternative embodiments, the gasification system 10 may bypass or not include the first stage grinding unit 34. Rather, the first stage feed 21 may be fed to the gasifier 12 and the feed combining and packing system 38 directly from a feedstock source. For example, in certain embodiments, the first stage feed 21 may be fluid petroleum coke or any other suitable feedstock having a fine PSD (e.g., $PSD_1$) that is suitable for gasification in the gasifier 12. As such, the fluid petroleum coke may be fed directly into the gasifier 12 during start-up without grinding in the first stage grinding unit 34. In certain embodiments, the fluid petroleum coke may be fed to the second stage feed dryer 284 (e.g., if the petroleum coke requires drying before feeding to the reactor 98). Similarly, the second stage grinding unit 28 may be bypassed or omitted. For example, in embodiments where the second stage feed 30 is a biomass feed that already has a coarse PSD (e.g., the $PSD_2$) that is suitable for use as a second stage feed 22 to the raining bed reactor system 16.

As should be noted, the grinding and drying section 196 may receive materials other than the feedstock 26. For example, the grinding and drying section 196 may receive additives, such as a slagging additive or any other desired additive that may be ground to a desired PSD. The additive may be mixed with the first stage feed 21, the second stage feed 22, or a combination thereof. In embodiments where the additive is finely ground and mixed with the first stage feed 21, the second stage feed 22 or the combined first stage and second stage feed 44, the additive may elutriate with the second stage raw product syngas 236 and be recovered in the gas-solids separation section 150. The recovered additive may be fed to the gasifier 12 along with the combined first stage feed 25, as discussed above.

Figure 14:
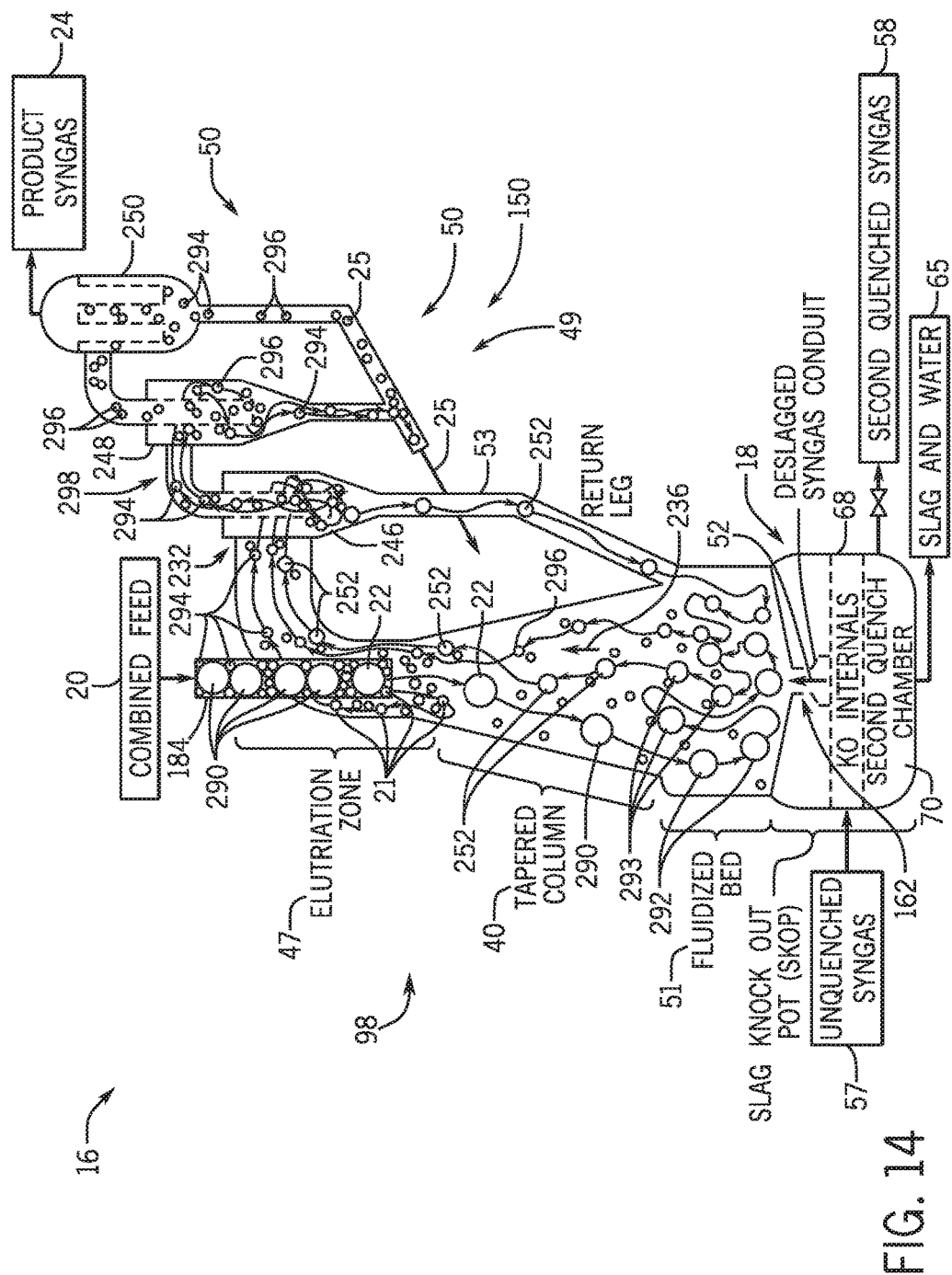
FIG. 14 is a schematic diagram of an embodiment of the raining bed reactor system that may be used with the gasification system of FIGS. 1 and 2, illustrating flow of the combined first and second stage feedstock of FIG. 5.

FIG. 14 is a schematic diagram illustrating a flow of feed particles into and reacting particles through the raining bed reactor system 16 configured to gasify the second stage feed 22 and to direct the first stage feed 21 to the gasifier 12. As discussed above, the raining bed reactor system 16, which is positioned immediately downstream of the particulate removal system 18, includes the raining bed reactor 98 and the gas-solids separation section 150. During operation of the gasification system 10, the second feed injector 184 feeds the combined first stage and second stage feed 20 to the elutriation zone 47 of the reactor 98. In the elutriation zone 47 the first stage feed 21 separates from the second stage feed 22 based on a size and density of the particles. For example, in the illustrated embodiment, second stage feed particles 290 flow from the second feed injector 184 downwards into the tapered raining bed reactor column 40 and then continue downwards into the fluidized bed reactor 51. During the downward flow, the second stage feed particles 290 absorb thermal energy (e.g., heat) from the fourth syngas portion 52 flowing in an opposite direction (e.g., counter current). That is, the fourth syngas portion 52 flows upward from the particulate removal system 18 towards the elutriation zone 47. As should be noted, the fourth syngas portion 52 is not quenched prior to entering the reactor 98. Therefore, the fourth syngas portion 52 provides sufficient thermal energy to preheat, dry (e.g., release internal moisture), devolatilize, pyrolyze, and gasify the second stage feed particles 290 and to generate additional syngas within the raining bed reactor 98. The additional syngas mixes with the fourth syngas portion 52 in the reactor 98 to produce a second stage raw product syngas 236 that comprises the fourth syngas portion 52, the additional syngas generated within the raining bed reactor 98 by the gasification of the second stage feed 22 plus partially reacted second stage feed particles which eventually gasify sufficiently that they get carried up and out of the system. As the raw second stage syngas 236 flows upward toward the elutriation zone 47, the syngas 236 cools as the second stage feedstock particles 290 fall (e.g., "rain") down the tapered raining bed reactor column 40, thereby driving the gasification of the second stage feedstock particles 290.

During the gasification process in the raining bed reactor 98, the second stage feed particles 290 lose mass and become less dense, thereby generating partially reacted feedstock particles 292. In certain embodiments, the second stage feedstock particles 290 also decrease in diameter. The decreasing mass, density and diameter of the reacting second stage feed particles 292 results in lower terminal velocities for the partially reacted feed particles 292 compared to the terminal velocities of the fresh second stage feed particles 290. (The plural term "velocities" is used because the fresh 290 and reacting 292 second stage feed particles are described by a particle size distribution, $PSD_2$.) The decreasing terminal velocities cause the raining second stage feed particles 292 to slow in their descent as they react. But they are further slowed because, as they descend further down the length of the tapered raining bed reactor column 40, they encounter lower upward syngas velocities and, therefore, lower upward drag forces. The reason for this reduction in syngas velocity and reduction in upward drag force when moving down the length of the tapered raining bed reactor column 40 is that the column diameter and, therefore, the column cross-sectional flow area increases when moving in the downward direction. This increase in diameter and cross-sectional area and the resulting decrease in upward syngas velocity and upward drag force continues until the fluidized bed reactor 51 is reached and the inner diameter becomes constant. As reacting second stage feed particles 292 rain downward through the tapered column 40, they slow dramatically as a result of their decreasing terminal velocities and the decreasing upward drag force. The smallest of the second stage feed particles 290 (e.g. those on the small particle end of the particle size distribution $PSD_2$) may preheat, dry, pyrolyze and react fast enough and may lose enough mass, density and diameter that they are able to progress only part-way down the tapered raining bed reactor column 40 before they reverse course and are carried up through the elutriation zone 47 and out of the top of the raining bed reactor 98. However, most of the second stage feed particles 290 will make it all the way down to the fluidized bed reactor 51 as partially reacted second stage feed particles 292. Once there, the partially reacted particles within the fluidized bed 293 will be kept suspended (i.e. kept fluidized) by the high velocity jet of the fourth portion 52 of the first syngas 14 that enters the bottom of the fluidized bed through the bottom opening 162. These partially reacted fluidized bed particles 293 will remain in the fluidized bed reactor 51 and will continue to react with the syngas 52 until they experience enough mass, density and diameter loss that the rising syngas is able to drag them back up through the tapered raining bed reactor column 40 to the elutriation zone 47 (illustrated by particles 252). There they join the first stage feed 21 particles that, because of their small size, reversed course as soon as they exited the second feed injector 184 and passed upwards through the elutriation zone 47.

Once the partially reacted feed particles 292, 293 have reacted sufficiently within the fluidized bed reactor 51, the mass, density and diameter of the reacted feed particles 292, 293 decreases such that the raw second stage syngas 236 is able to carry the particles upward. For example, in the illustrated embodiment, the particles 252 become entrained with the syngas 236 and flow upward toward the elutriation zone 47 and into the gas-solids separation section 150. In certain embodiments, despite the loss of some mass, density and diameter within the fluidized bed reactor 51 and tapered raining bed reactor column 40, the particles 252 still have mass, density and diameter that are greater than feedstock particles 294 from the first stage feed 21. Accordingly, the coarse solids separation system 49 comprised of the first cyclone 246 (e.g. the coarse solids separation cyclone) captures the particles 252 that have mass, density and diameter greater than the density of the particles in the first stage feed 21, 294 and recirculates the particles 252 to the fluidized bed reactor 51 via the return leg 53 that couples the bottom of the first cyclone 246 with the fluidized bed reactor 51. The recirculated particles 252 then continue to absorb thermal energy from the fourth syngas portion 52 and continue to gasify in the fluidized bed reactor 51, thereby generating additional second stage raw product syngas 236 and experiencing further loss of mass, density and diameter.

The particles 252 continue to recirculate through the reactor 98, the first cyclone 246 and the return leg 53 until the mass, density and diameter of the particles 252 is approximately less than or equal to the mass, density and diameter of first stage feed particles 294 from the first stage feed 21. For example, extensively reacted fine particles 296 are generated from the particles 252 that have been recirculated and undergone gasification in one or more cycles through the reactor 98, the first cyclone 246 and the return leg 53. Similar to the particles 252, the fine reacted particles 296 are carried upward by the syngas 236 and flow into the gas-solids separation section 150 along with the first stage feed particles 294. The mass, density and diameter of the extensively reacted fine particles 296 and the first stage feed particles 294 is such that the particles 294, 296 are able to pass through the first cyclone 246 and enter the conduit 298 that couples the overhead of the first cyclone 246 with the inlet of the second cyclone 248. Therefore, the particles 294, 296 are not captured in the first cyclone 246 and flow into the second cyclone 248 (e.g. the escaped solids cyclone) along with the raw second stage syngas 236. As should be noted, slag and ash particles that may be generated in the reactor 98 as a result of the gasification of the second stage feed 22 may also be entrained in the syngas 236 and separated from the syngas 236 in the escaped solids separation section 50, which comprises the second cyclone 248 and the filter 250.

The second cyclone 248 is configured to capture the particles 294, 296 and direct a flow of the particles 294, 296 as combined first stage feed 25 to the gasifier feed and metering system 23. In certain embodiments, a portion of the first stage feed particles 294, the extensively reacted fine particles 296, or a combination thereof may not be captured in the second cyclone 248. Accordingly, the filter 250 is configured to capture any remaining particles 294, 296 that may not have been separated from the syngas 236 in the cyclones 246, 258. In this way, the system 10 generates substantially particle free product syngas 24. The particles captured in the filter 250 are combined with the particles from the second cyclone 248 and directed to the gasifier feed and metering system 23. The flow of the particles 294, 296 from the second cyclone 248 and filter 250 to the gasifier feed and metering system 23 may be via gravity or by other means, for example a gas-driven eductor 316. The gasifier feed and metering system 23 feeds the particles 294, 296 to the gasifier 12, and the particles 294, 296 are gasified in the reaction chamber 13, as discussed above.

The configuration of the raining bed reactor system 16 results in an extended residence time for the second stage feed 22, thereby providing more time for the larger, more massive feed particles 290, 292 to react. For example, injecting the combined first stage and second stage feed 20 at the top of the reactor 98 at a low velocity, such that the downward driving force for the second stage feed 22 is essentially gravity alone, and decreasing the velocity of the feedstock particles and the gas with the geometry of the tapered raining bed reactor column 40 results in an increase in the residence time of the feed particles 290, 292, 293, 252, 296 in the reactor 98. As discussed in further detail below, with reference to FIGS. 15-17, the geometric configuration of the components of the raining bed reactor system 16 (e.g., the fluidized bed reactor 51, the tapered raining bed reactor column 40, etc.) may be varied to adjust the residence time of the feed particles 290, 292, 293, 252, 296 in the reactor 98 such that the feed particles 290, 292, 293, 252, 296 have sufficient time to reach a desired extent of reaction.

In addition to the increased residence time of the feed particles 290, 292, 293, 252, 296 within the reactor 98, the counter current flow between the feed particles 290 and the fourth syngas portion 52 generates relatively constant, substantial heat and mass transfer gradients between the second stage feed particles 290 and the syngas 52, 236 along the entire length of the raining bed reactor 98. This is a significant contrast to a co-current flow configuration which has very large heat and mass transfer gradients at the inlet of the reactor that diminish quickly along the length of the reactor. Thus, the counter current flow configuration of reactor 98 serves to increase the effectiveness of recovering thermal energy from the syngas 52, 236, the effectiveness of transferring mass between the reacting second stage feed particles 290 and the syngas 52, 236, and the effectiveness of converting the thermal energy into the chemical energy of the increased flow rate of raw, second stage syngas 236. (Note that a more effective process step requires less contact area and less contact volume, i.e. smaller, less expensive equipment, to accomplish a transfer of thermal energy or a transfer of mass than a less effective process step.) This increased effectiveness in converting the second stage feed 22 into syngas reduces an amount of the feedstock and the gasifying agent 60 consumed by the gasification system 10 to generate the product syngas 24. Moreover, because the reactor 98 in the raining bed reactor system 16 is configured to receive dry and large/coarse feed particles (e.g., the second stage feed particles 22, 290), the overall grinding and drying energy required and the amount of excess water fed to the gasification process is decreased. Accordingly, the overall syngas throughput and gasification efficiency of the gasification system may be increased.

FIGS. 15-17 illustrate non-limiting examples of possible geometric configurations for the raining bed reactor 98, which is comprised of a fluidized bed reactor 51, the tapered raining bed reactor column 40 and an elutriation zone 47. Rotation of the two dimensional geometric profiles shown in FIGS. 15-17 about the vertical axis 188 defines the three dimensional interior geometry of each configuration. The various geometries have an impact on the behavior and performance of the raining bed reactor 98. In all three of these figures, the fluidized bed reactor 51 is defined by a vertical, narrow diameter inlet passage 162, an upward facing floor 300 and a vertical wall 302; the tapered raining bed reactor column 40 is defined by a downward facing tapered wall 304; and the elutriation zone 47 is defined by the uppermost portion of the tapered wall 304 and a vertical, narrow diameter outlet passage 305, as indicated by the bracket at the top of each figure.

In all three cases shown in FIGS. 15-17, the fluidized bed reactors 51 have inlet passages 188 and vertical side walls 302 that are of the same vertical length and inner diameter. The difference in the three configurations is in the shape of the floor 300. In FIG. 15, the floor 300 has an upward facing convex shape. In FIG. 16, the floor 300 has an upward facing concave shape. In FIG. 17, the floor has a straight line shape oriented at an angle 310 from the vertical axis 188. The shape of the floor 302 impacts the way the jet of syngas (e.g. the fourth portion of the first syngas 52) entering through the inlet passage 162 interacts with the gas and solids in the fluidized bed reactor 51. In all cases, the diameter of the inlet passage 162 is made small enough so that the velocity of the inlet jet always exceeds the terminal velocity of the largest, most dense particles within the second stage feed 22. This ensures that no particles are able to escape through the bottom of the fluidized bed via the inlet passage 162. In FIG. 16, the concave floor 300 abruptly increases the flow cross-sectional area encountered by the high velocity inlet jet (e.g., second feed injector 184), which maximizes the recirculation flow pattern within the fluidized bed as gas and particles from above are entrained within the jet. The recirculation pattern driven by the inlet jet promotes backmixing within the fluidized bed reactor 51, which causes the fluidized bed to behave like a continuously stirred tank reactor (CSTR). In contrast, in FIG. 15, the convex floor 300 gradually increases the flow cross-sectional area encountered by the inlet jet, which minimizes the recirculation flow pattern and the backmixing and causes the fluidized bed to behave more like a plug flow reactor (PFR). In FIG. 17, the floor is straight, i.e. neither convex nor concave. As a result, the behavior and performance of the fluidized bed in FIG. 17 would be expected to be intermediate between that of the fluidized bed in FIG. 15 and the one in FIG. 16. The high amount of backmixing characteristic of a CSTR may increase the residence time of some of the smaller particles and may provide for more uniform temperatures throughout the fluidized bed reactor.

In all three cases shown in FIGS. 15-17, the tapered raining bed reactor columns 40 have the same inlet diameter (from the perspective of the direction of gas flow), the same outlet diameter and the same vertical length. However, in FIG. 15, the wall of the tapered column 304 is convex downward. In FIG. 16, the wall of the tapered column 304 is concave downward. And in FIG. 17, the wall of the tapered column 304 is neither convex nor concave, but has a straight line shape oriented at an angle 312 from the vertical axis 188. The shape of the wall 304 affects the velocity profile within the tapered raining bed reactor column 40. With fixed and equal syngas flows moving up through each of the three columns, smaller diameters result in higher gas velocities whereas larger diameters result in lower gas velocities. Thus, the shape of the wall of the tapered column 304 will affect the velocity profile along the vertical axis of the column. In FIG. 15, the convex wall forces the upward moving gas into smaller cross-sectional areas of flow lower down in the column compared with the concave wall in FIG. 16. As a result, the upward moving syngas in the FIG. 15 configuration will begin to accelerate sooner (i.e. lower down in the column) than in the FIG. 16 configuration; and the rate at which the acceleration increases will be more rapid compared to FIG. 16. This means that the FIG. 15 configuration may be more effective in picking up partially reacted coal particles out of the top of the fluidized bed reactor 51 and accelerating them back up the tapered raining bed reactor column 40. Said in another way, the FIG. 15 configuration will be more effective at preventing smaller particles from entering and raining down into the tapered raining bed reactor column 40. In contrast, the FIG. 16 configuration will have a much more gradual decrease in gas velocity in the direction of syngas flow. That means it will be more effective at allowing smaller particles to enter the tapered column, and it may provide longer particle residence times as well. The larger overall interior volume of this configuration may allow it to have higher second stage feed 22 capacity. The FIG. 17 configuration will have a velocity profile and performance that is intermediate between the profiles of FIG. 15 and FIG. 17.

Each elutriation zone comprises a converging section defined by of the uppermost portion of the tapered wall 306 plus a straight section defined by the vertical, narrow diameter outlet passage 163. The approximate location of the exit plane of the second feed injector 184 within the elutriation zone 47 is indicated by the ellipse 308 located roughly in the middle of each zone. The rising syngas accelerates as it moves through the converging sections of each elutriation zone. The convex converging section of the FIG. 15 elutriation zone 47 is more gradual than that of the convex converging section of FIG. 16, which means that the finer particles of the combined first stage and second stage feed 20 (e.g. the first stage feed 21 particles) will encounter accelerating gas velocities for a longer distance than they will encounter in the FIG. 16 configuration. Thus, the FIG. 15 configuration may be more effective in preventing finer particles from entering the tapered raining bed reactor column 40 and may be better at elutriating the finer first stage feed 21 particles out of the combined first stage and second stage feed 44. The FIG. 17 configuration may be expected to have a performance that is between the FIG. 15 and FIG. 16 performance.

One skilled in the art will appreciate that the elements of the three configurations shown in FIGS. 15-17 can be combined in various ways to generate additional designs with slightly different effects on reactor performance. For example, a raining bed reactor 98 could be designed with a concave floor 300 in the fluidized bed reactor 51 and a convex tapered raining bed reactor column wall 304 and a convex lower section 306 of the elutriation zone 47. Such a raining bed reactor 98 design would have enhanced backmixing in the fluidized bed reactor 51, efficient transfer of fine, partially reacted coal particles back up through the tapered raining bed reactor column 40 and highly effective elutriation of the first stage feed 21 in the elutriation zone. Other possibilities exist as well, depending on the needs of the overall design of the plant in which such a two-stage gasification process 10 will function.

Figure 18:
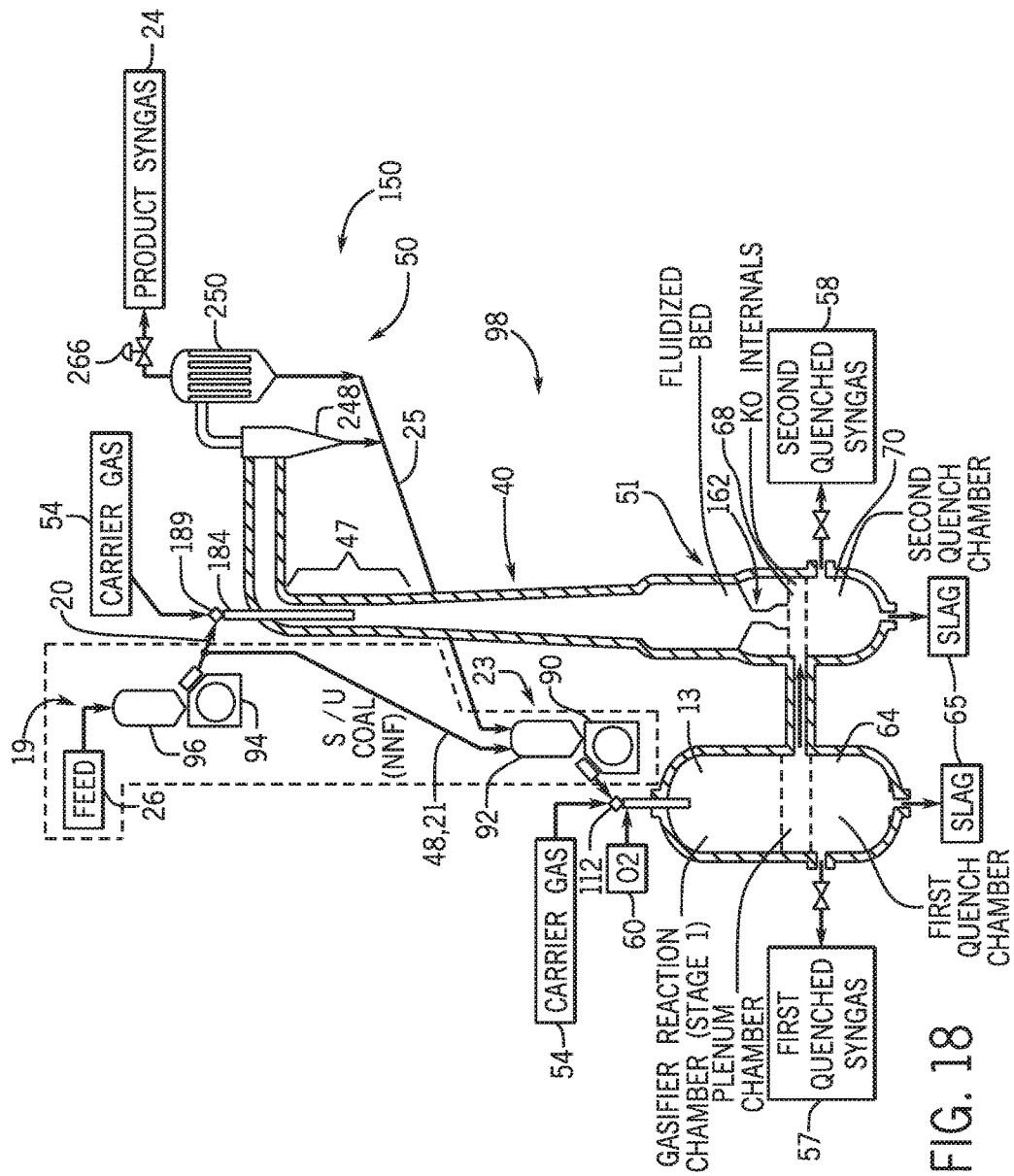
FIG. 18 is a schematic diagram of an embodiment of the gasification system of FIG. 1 in which the raining bed reactor system includes a gas-solids separation section having one cyclone and a filter and no return leg to the fluidized bed reactor.
Figure 19:
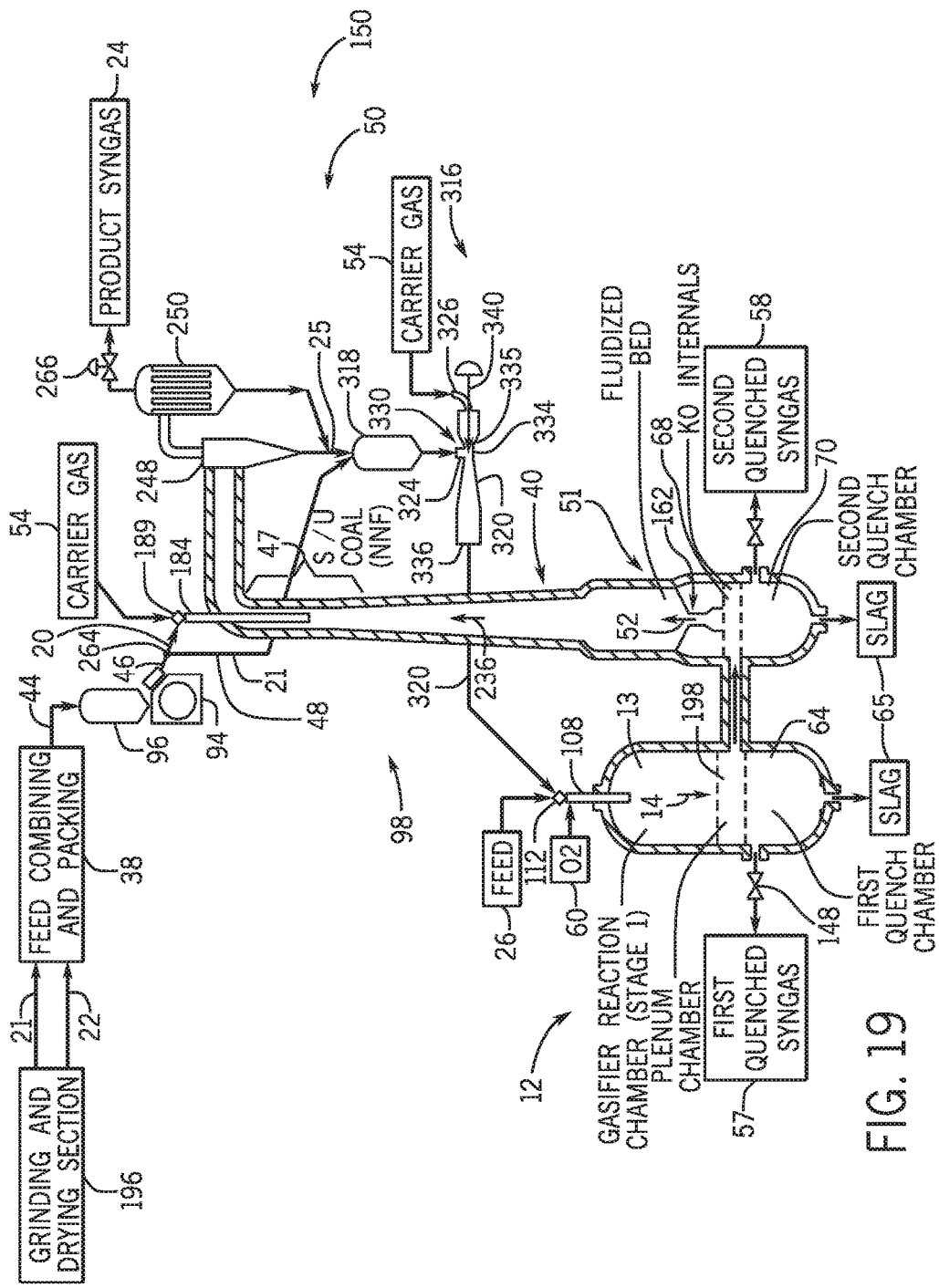
FIG. 19 is a schematic diagram of an embodiment of the gasification system of FIG. 1 in which the raining bed reactor system includes a gas-solids separation section having one cyclone and a filter and no return leg to the fluidized bed reactor as well as an eductor.

In certain embodiments, the raining bed reactor system 16 does not recirculate partially reacted feed particles 252 to the fluidized bed reactor 51 via a return leg 53. Therefore, the raining bed reactor system 16 may not include the coarse solids separation system 49 having the first cyclone 246 (the coarse solids separating cyclone) or the return leg 53. FIGS. 18 and 19 illustrate embodiments of the raining bed reactor system 16 in which the gas-solids separation system 150 does not include the coarse solids separation system 49 (i.e. the first cyclone 246) or the return leg 53. In these particular embodiments, the $PSD_2$ of the second stage feed 22 is such that the coarse solids separation system 49 (i.e. the first cyclone 246) and the return leg 53 may be omitted from the gasification system 10. The second stage feed 22 (e.g., the feed particles 290, 292 and 293) remain in the fluidized bed reactor 51 until the mass, density and diameter of the feed particles decreases to approximately the mass, density and diameter of the first stage feed particles 294. The reduced mass feed particles 296 may become entrained with the syngas 236 and carried into a modified gas-solids separation section 150 including only an escaped solids separation system 50 (i.e. the second cyclone 248 and the filter 250). The entrained partially reacted second stage feed particles 296 and the first stage feed particles 294 are separated from the raw second stage syngas 236 by the second cyclone 248 and filter 250, and fed to the gasifier 12, as discussed above with reference to FIGS. 1, 2 and 14.

In certain embodiments, such as the one shown in FIG. 19, the gasification system 10 includes a high pressure eductor feed system 316 (e.g., a Venturi eductor) fluidly coupled to the modified gas-solids separation section 150 having the escaped solids separation system 50. This replaces the gasifier feed metering and feeding system 23 shown in FIGS. 1, 2 and 18, and allows the first solids pump 90 to be eliminated from the process. The eductor feed system 316 includes an adjustable gas-driven eductor 320 and an eductor feed vessel 318. During startup, the eductor feed vessel 318 receives first stage feed 21 directly from the second solids pump 94. This allows the gasifier 12 to be started up in order to produce the first syngas 14 and the fourth portion 52 of the first syngas which, in turn, allows the raining bed reactor 98 and the gas-solids separation system 150 to be started. Similar to the startup process shown for FIGS. 1 and 2, the eductor feed vessel 318 is filled as part of the startup procedure in order to provide a continuously available source of first stage feed 21 to the gasifier 12 while the position of flow diverter 264 is changed in order to route the first stage feed 21 to the second feed injector 184 instead of directly to the eductor feed vessel 318. Once the flow path of the first stage feed 21 has been diverted to the raining bed reactor 98 and the gas-solids separation system 150 has begun to produce a recovered stream of first stage feed 21, the inventory of gasifier feed material will continue to be maintained within the eductor feed vessel 318, and the eductor 320 will continue to feed the first stage feed 21 recovered from the gas-solids separation system 150 to the gasifier 12. Once the flow path of solids pump 94 to second feed injector 184 to gas-solids separation section 150 to eductor feed vessel 318 to eductor 320 to first feed injector 108 to gasifier 12 has been established, the operation of the grinding and drying section 196 of the raining bed reactor feed system 19 may be altered in order to being producing the combined first stage and second stage feed 44 consisting of the first stage feed 21 and the second stage feed 22. Once production of the combined first stage and second stage feed 44 has been established, and the pressurized and metered combined first stage feed 20 is fed to the raining bed reactor system 16, partially reacted second stage feed 22 particles and elutriated first stage feed 21 particles will be captured by the gas-solids separation system 150 and a combined first stage feed 25 will be fed to the eductor feed vessel 318 and, ultimately, to the gasifier 12. At that point, the backpressure control valve 266 can be used to build and maintain normal operating pressure within the two-stage gasification system 10. It should be noted that, as the gasification system generates product syngas 24 and builds pressure under control of backpressure control valve 266, the feed equipment naturally compensates for the increase in system pressure. The solids pump 94 (e.g. a Posimetric Feeder manufactured by GE) behaves like a conventional positive displacement pump in that its discharge pressure always equals the pressure of the downstream system into which it is pumping. And because the eductor feed vessel 318 is fluidly coupled to the gas-solids separation system 150, the pressure inside the eductor feed vessel 318 will naturally rise at the same rate as the rest of the gasification system 10. With the compressed carrier gas 54 supplied at an appropriately high pressure, the eductor 320 can be driven to deliver the combined first stage and second stage feed 20 at a pressure that is sufficient to overcome the system pressure drop from the inlet of the first feed injector 108 to the bottom of the eductor feed vessel 318.

The eductor 320 includes a feedstock inlet 324 that is connected to the eductor feed vessel 318 and a gas inlet 326 upstream of the feedstock inlet 324. During operation of the gasification system 10, the eductor feed vessel 318 receives the particulates 25 from the gas-solids separation section 150 and feeds the particulates 25 to the eductor 320 via the feedstock inlet 324. The gas inlet 326 is coupled (e.g., connected) to a high pressure motive gas source (e.g., carrier gas 54) that enables the flow of the particulates 25 via the eductor 320 to the first feed injector 108, which feeds the particulates 25 (e.g., the combined first stage feed 21 and the partially reacted second stage feed 22) to the gasifier 12. For example, as the carrier gas 54 moves through the eductor 320, a low pressure zone 330 is created at a throat 334 of the eductor 320. The low pressure in the throat 334 induces the particulates 25 to move from the eductor feed vessel 318 into the eductor 320. The particulates 25 are mixed with the carrier gas 54 and pneumatically carried through the feed outlet 336 and into the first feed injector 108, which feeds the particulates 25 to the gasifier 12. Therefore, rather than feeding the first stage feed 21 (during startup) or the combined first stage and second stage feed 20 (during normal operation) to the gasifier 12 via the solids pump 90 in the gasifier feed and metering system 23, the feed may be fed to the gasifier 12 using the gas-driven eductor 320.

The eductor 320 includes an internal trim 335 connected to an adjustable stem 340 that may be manipulated to position the trim within the throat 334 to adjust the cross-sectional flow area of the throat 334. As such, the adjustable stem 340 and trim 335 may control the flow rate of the carrier gas 54 into the eductor 320, thereby controlling the flow rate of the particulates comprising the combined first stage and second stage feed 20 (e.g., the first stage feed 21 and the partially reacted particles of the second stage feed 22) into the gasifier 12.

As described above, certain embodiments of the system 10 may include generating the first syngas 14 from the combined first stage and second stage feed 20 including the first stage feed 21 having a fine PSD1 suitable for gasification in gasifier 12 and partially reacted fine particles of the second stage feed 22. The first syngas 14 is processed in the particulate removal system 18 to remove any entrained particulates (e.g., the slag mixture 65), such that the first syngas 14 is substantially particulate-free (e.g. the fourth syngas portion 52). The system 10 also combines the first stage feed 21 with the second stage feed 22 having a coarse $PSD_2$ suitable for gasification in the raining bed reactor 98, and feeds the combined feed (e.g., the combined first stage and second stage feed 20) to the raining bed reactor system 16. The second stage feed 22 absorbs heat from the fourth syngas portion 52, which is substantially free of particulates, to generate additional syngas, which combines with the fourth syngas portion 52 to generate the second stage raw syngas 236. The second stage raw syngas 236 carries the first stage feed 21 and partially reacted particles of the second stage feed 22 into the gas-solids separation section 150. The gas-solids separation section 150 separates at least a portion of the partially reacted particles in the second stage feed 22 from the syngas 236, and recirculates the partially reacted particles 252 to the reactor 98. In addition, the gas-solids separation system 150 separates the first stage feed 21 and a second portion of the partially reacted particles from the second stage feed 22 (e.g., the particulates 296) and feeds them to the gasifier 12 to generate the first syngas 14. In this way, the energy requirement for producing the syngas 14, 24 may be decreased, and the overall amount of the product syngas 24 output by the gasification system 10 for a given amount of feed coal consumed and a given amount of oxygen consumed may be increased. Accordingly, the gasification efficiency of the gasification system 10 may be increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a first reactor configured to gasify a first feed to generate a first syngas, wherein the first feed has a first particle size distribution ($PSD_1$);
   a second reactor configured to receive the first feed, a second feed, and at least a portion of the first syngas, wherein the second reactor is configured to gasify the second feed to generate additional syngas, and the second feed has a second particle size distribution ($PSD_2$) that is different from the first PSD, and wherein the second reactor comprises:
      an elutriation zone disposed on a first end of the second reactor, wherein the elutriation zone is configured to receive the first and second feed;
      a fluidized bed disposed at a second end of the second reactor that is substantially opposite the first end, wherein the fluidized bed is fluidly coupled to the first reactor and configured to receive the portion of the first syngas via a syngas inlet; and
   a gas-solids separation section fluidly coupled to the first and second reactors, wherein the gas-solids separation section is configured to receive the first feed and partially reacted particles of the second feed from the elutriation zone and to feed a combined feed consisting of the first feed and the partially reacted particles of the second feed to the first reactor.

2. The system of claim 1, wherein the gas-solids separation section comprises a first cyclone and a second cyclone, wherein the first cyclone is configured to separate a first portion of the partially reacted second feed particles from a product syngas and the second cyclone is configured to separate first feed particles and a second portion of the partially reacted second feed particles from the product syngas.

3. The system of claim 2, wherein the first cyclone is fluidly coupled to the second reactor and configured to feed the first portion of the partially reacted second feed particles to the fluidized bed and the second cyclone is fluidly coupled to the first cyclone and configured to feed the first feed particles and the second portion of the partially reacted second feed particles to the first reactor.

4. The system of claim 1, wherein the gas-solids separation section comprises a cyclone and a filter, wherein the cyclone and the filter are configured to separate first feed particles and at least a portion of the partially reacted second feed particles from the product syngas, and wherein the cyclone and the filter are fluidly coupled to the first reactor and configured to feed the first feed particles and at least a portion of the partially reacted second feed particles to the first reactor.

5. The system of claim 1, comprising a particulate removal system disposed upstream of the second reactor and fluidly coupled to the first reactor and the fluidized bed, wherein the particulate removal system is configured to remove particulates from the first syngas to generate the portion of the syngas fed to the fluidized bed.

6. The system of claim 1, comprising a first reactor feed system and a second reactor feed system, wherein the second reactor feed system is fluidly coupled to the elutriation zone and the first reactor feed system, the second reactor feed system is configured to supply the first feed and the second feed to the second reactor, and wherein the first reactor feed system is fluidly coupled to the second reactor feed system, the first reactor, and the gas-solids separation section and configured to supply the first reactor with the first feed and with a combined feed consisting of the first feed and partially reacted second feed particles.

7. The system of claim 6, wherein the second reactor feed system comprises a flow diverter configured to direct a flow of the first feed to the first reactor feed system, the second reactor, or a combination thereof.

8. The system of claim 6, wherein the first reactor feed system comprises an eductor.

9. The system of claim 1, wherein the second reactor comprises a tapered column disposed between the elutriation zone and the fluidized bed, wherein the tapered column comprises a first diameter adjacent to the elutriation zone and a second diameter adjacent to the fluidized bed, and wherein the second diameter is greater than the first diameter.

10. The system of claim 1, wherein the second reactor comprises a feed inlet disposed on the first end of the second reactor configured to direct the first and second feed into the second reactor in a direction that is substantially opposite a flow direction of the product syngas.

* * * * *